United States Patent
Sasaki et al.

(10) Patent No.: US 10,954,876 B2
(45) Date of Patent: Mar. 23, 2021

(54) VEHICLE SYSTEM

(71) Applicant: TOYOTA JIDOSHA KABUSHIKI KAISHA, Toyota (JP)

(72) Inventors: Keisuke Sasaki, Susono (JP); Naoto Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/371,192

(22) Filed: Apr. 1, 2019

(65) Prior Publication Data
US 2019/0368440 A1 Dec. 5, 2019

(30) Foreign Application Priority Data

May 30, 2018 (JP) .............................. JP2018-103635

(51) Int. Cl.
*F02M 1/00* (2006.01)
*F02D 41/22* (2006.01)
*F02D 9/08* (2006.01)
*F02D 11/10* (2006.01)

(52) U.S. Cl.
CPC ............. *F02D 41/222* (2013.01); *F02D 9/08* (2013.01); *F02D 2011/101* (2013.01)

(58) Field of Classification Search
CPC .......... F02D 9/00; F02M 59/34; F02M 69/18; F02M 69/24; F02M 69/26
USPC ................................ 123/462, 472, 478–480
See application file for complete search history.

(56) References Cited

U.S. PATENT DOCUMENTS

| 2004/0069271 | A1* | 4/2004 | Kanno ................... | F02B 61/045 123/396 |
| 2010/0024790 | A1* | 2/2010 | Fujiwara ............... | F02D 13/023 123/674 |
| 2011/0082629 | A1* | 4/2011 | Soejima .................... | F02P 5/14 701/54 |
| 2012/0022770 | A1* | 1/2012 | Soejima .................. | F02D 11/10 701/104 |
| 2013/0030675 | A1* | 1/2013 | Minase ................... | F02D 29/02 701/110 |
| 2014/0180522 | A1* | 6/2014 | Ideshio ................. | B60W 20/00 701/22 |

(Continued)

FOREIGN PATENT DOCUMENTS

JP 2006-200466 A 8/2006

*Primary Examiner* — John Kwon
(74) *Attorney, Agent, or Firm* — Oliff PLC

(57) ABSTRACT

A vehicle system includes: an internal combustion engine including an electronically-controlled throttle valve configured to change throttle opening degrees in a step-wise manner among at least three selectable opening degrees, and being mounted on a vehicle; and a control device configured to control the vehicle. The control device includes a required throttle opening degree setting component and a first throttle opening degree selecting component. The first throttle opening degree selecting component is configured to: select, at the time of acceleration of the vehicle, a first throttle opening degree that is greater than the required throttle opening degree and is the closest to the required throttle opening degree; and select, at the time of deceleration of the vehicle, a second throttle opening degree that is smaller than the required throttle opening degree and is the closest to the required throttle opening degree.

9 Claims, 11 Drawing Sheets

(56) References Cited

U.S. PATENT DOCUMENTS

2015/0377163 A1* 12/2015 Ukawa .................. F02D 11/105
   123/395
2018/0202372 A1* 7/2018 Doyama ............... F02D 11/105

* cited by examiner

VEHICLE SYSTEM

CROSS-REFERENCE TO RELATED APPLICATION

This application is based on and claims the benefit of Japanese Patent Application No. 2018-103635, filed on May 30, 2018, which is incorporated by reference herein in its entirety.

BACKGROUND

Technical Field

The present disclosure relates to a vehicle system, and more particularly to a vehicle system configured to control a vehicle on which an internal combustion engine is mounted.

Background Art

For example, JP 2006-200466 A discloses an output control device for an internal combustion engine. The output control device calculates a throttle opening degree on the basis of a required engine torque.

SUMMARY

In order to simplify the configuration of a throttle valve to reduce cost, the resolution (LSB: Least Significant Bit) of the throttle opening degree may be lowered (in other words, the number of selectable opening degrees that can be selected as throttle opening degrees may be decreased).

If, however, this resolution is low, a required throttle opening degree may become difficult to coincide with a selectable opening degree, and the difference between the required throttle opening degree and a selectable opening degree near the required throttle opening degree may increase. There is a concern that, if this difference increases, an engine torque generated by an internal combustion engine may be greatly separated from a value according to the required throttle opening degree. Because of this, where the resolution of the throttle opening degree is lowered to reduce cost, it is favorable to be able to select, among the selectable opening degrees, an appropriate throttle opening degree according to the condition of the vehicle.

The present disclosure has been made to address the problem described above, and an object of the present disclosure is to provide a vehicle system that can select an appropriate throttle opening degree according to the condition of the vehicle while lowering the resolution of the throttle opening degree to reduce cost.

A vehicle system according to one aspect of the present disclosure includes an internal combustion engine and a control device. The internal combustion engine includes an electronically-controlled throttle valve configured to change throttle opening degrees in a step-wise manner among at least three selectable opening degrees, and is mounted on a vehicle. The control device is configured to control the vehicle. The control device includes: a required throttle opening degree setting component configured to set a required throttle opening degree required for the vehicle; and a first throttle opening degree selecting component configured, where the required throttle opening degree does not coincide with any of the at least three selectable opening degrees, to select a throttle opening degree among the at least three selectable opening degrees. The first throttle opening degree selecting component is configured to: select, at a time of acceleration of the vehicle, a first throttle opening degree that is greater than the required throttle opening degree and is closest to the required throttle opening degree; and select, at a time of deceleration of the vehicle, a second throttle opening degree that is smaller than the required throttle opening degree and is closest to the required throttle opening degree.

The vehicle system may further include an electric motor operative to drive the vehicle. The control device may also be configured to control an engine torque of the internal combustion engine and a motor torque of the electric motor such that a required driving force required for the vehicle is met. The control device may be configured, where there is excess or shortage of the engine torque due to selection of the first throttle opening degree or the second throttle opening degree by the first throttle opening degree selecting component, to execute a first driving force adjustment control to control the motor torque such that a driving force of the vehicle approaches the required driving force.

The vehicle system may further include an electric generator configured to generate an electric power using an engine torque of the internal combustion engine; and a battery configured to store an electric power generated by the electric generator. The control device may also be configured, where there is excess of the engine torque due to selection of the first throttle opening degree by the first throttle opening degree selecting component, to execute a second driving force adjustment control to control a power generation load of the electric generator such that a driving force of the vehicle approaches a required driving force required for the vehicle.

The vehicle system may further include: an electric generator configured to generate an electric power using an engine torque of the internal combustion engine; and a battery configured to store an electric power generated by the electric generator. The first throttle opening degree selecting component may also be configured, where, even at the time of acceleration, a charging power upper limit value of the battery is lower than a first threshold value, to select the second throttle opening degree.

The vehicle system may further include: an electric generator configured to generate an electric power using an engine torque of the internal combustion engine; and a battery configured to store an electric power generated by the electric generator. The first throttle opening degree selecting component may also be configured, where, even at the time of deceleration, a charging rate of the battery is lower than a second threshold value, to select the first throttle opening degree.

The vehicle system may further include: an electric generator configured to generate an electric power using an engine torque of the internal combustion engine; and a battery configured to store an electric power generated by the electric generator. The first throttle opening degree selecting component may also be configured, where, even at the acceleration, a charging rate of the battery is higher than a third threshold value, to select the second throttle opening degree.

The control device may be configured, where selecting a selectable opening degree greater by two or more steps than the second throttle opening degree after selection of the second throttle opening degree by the first throttle opening degree selecting component, to execute an engine torque decrease control to decrease an excess of an engine torque of the internal combustion engine.

The control device may be configured, where selecting a selectable opening degree smaller by two or more steps than the first throttle opening degree after selection of the first throttle opening degree by the first throttle opening degree selecting component, to execute an engine torque increase control to compensate for a shortage of an engine torque of the internal combustion engine.

A vehicle system according to another aspect of the present disclosure includes an internal combustion engine, an electric generator, a battery and a control device. The internal combustion engine includes an electronically-controlled throttle valve configured to change throttle opening degrees in a step-wise manner among at least three selectable opening degrees, and is mounted on a vehicle. The electric generator is configured to generate an electric power using an engine torque of the internal combustion engine. The battery is configured to store an electric power generated by the electric generator. The control device is configured to control the vehicle. The control device includes: a required throttle opening degree setting component configured to set a required throttle opening degree; and a second throttle opening degree selecting component configured, where the required throttle opening degree does not coincide with any of the at least three selectable opening degrees, to select a throttle opening degree among the at least three selectable opening degrees. The second throttle opening degree selecting component is configured to: select, where a charging rate of the battery is lower than a fourth threshold value, a first throttle opening degree that is greater than the required throttle opening degree and is closest to the required throttle opening degree; and select, where the charging rate is higher than or equal to the fourth threshold value, a second throttle opening degree that is smaller than the required throttle opening degree and is closest to the required throttle opening degree.

According to the vehicle system of one aspect of the present disclosure, where the required throttle opening degree does not coincide with any of the selectable opening degrees, at the time of acceleration of the vehicle, the first throttle opening degree (i.e., a selectable opening degree that is greater than the required throttle opening degree and is the closest thereto) is selected, and, at the time of deceleration thereof, the second throttle opening degree (i.e., a selectable opening degree that is smaller than the required throttle opening degree and is the closest thereto) is selected. As a result, an appropriate throttle opening degree according to the condition of the vehicle (i.e., acceleration or deceleration of the vehicle) can be selected while lowering the resolution of the throttle opening degree to reduce cost.

According to the vehicle system of another aspect of the present disclosure, where the required throttle opening degree does not coincide with any of the selectable opening degrees, the first throttle opening degree is selected when the charging rate of the battery is lower, and the second throttle opening degree is selected when the charging rate is higher. As a result, an appropriate throttle opening degree according to the condition of the vehicle (i.e., the charging rate (SOC) of the battery) can be selected while lowering the resolution of the throttle opening degree to reduce cost.

DETAILED DESCRIPTION

Figure 1:
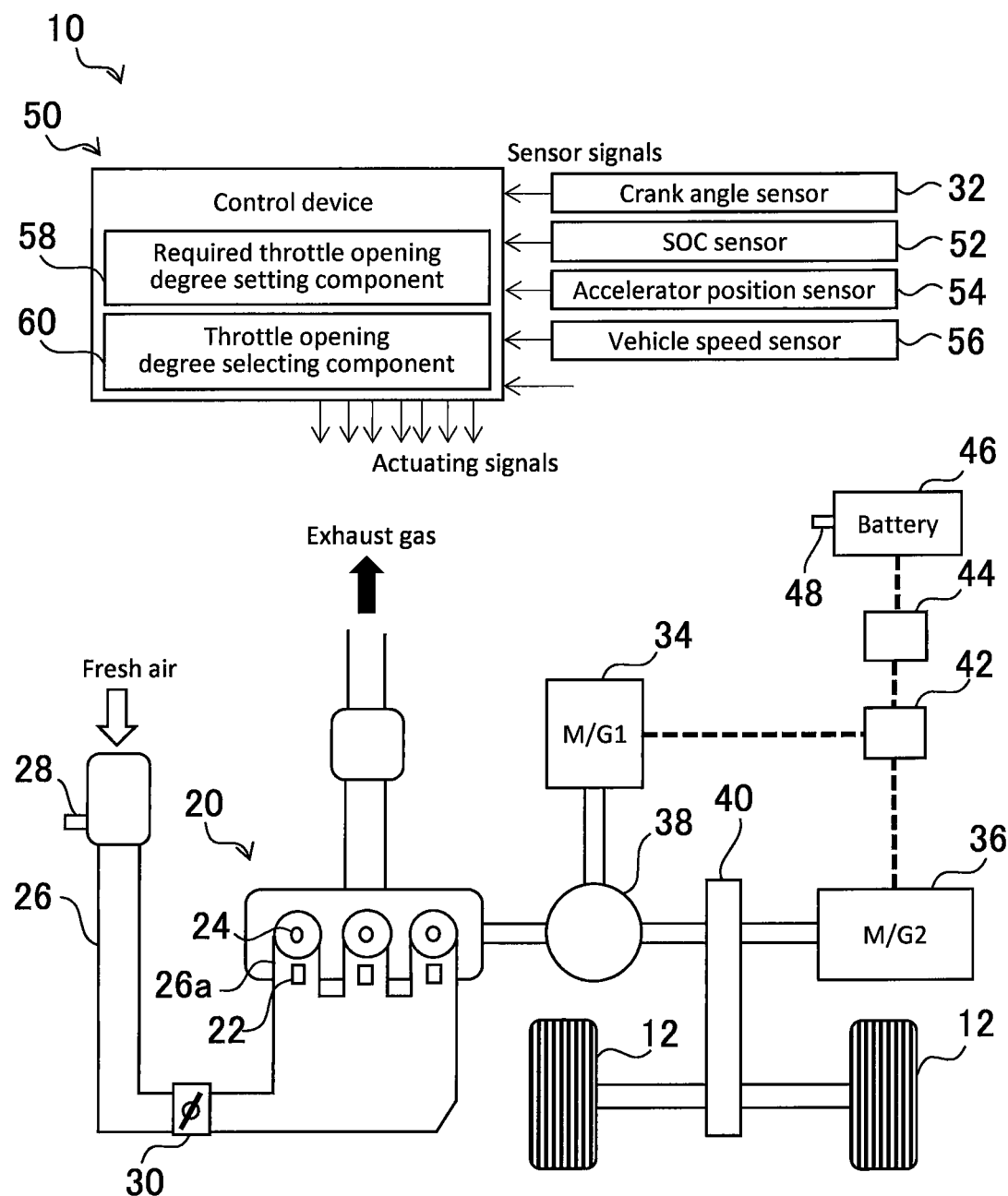
FIG. 1 is a diagram for schematically describing an example of the configuration of a vehicle system according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 4.

1-1. Example of Configuration of Vehicle System

FIG. 1 is a diagram for schematically describing an example of the configuration of a vehicle system 10 according to the first embodiment of the present disclosure. The vehicle system 10 shown in FIG. 1 is a system of a power-split hybrid vehicle (i.e., a series-parallel type hybrid vehicle) provided with a plurality of power devices.

The vehicle system 10 is provided with an internal combustion engine 20 as one of the power devices for rotationally driving vehicle wheels 12. As an example, the internal combustion engine 20 is a spark ignition in-line three-cylinder engine. The internal combustion engine 20 is equipped with fuel injection valves 22 and an ignition device 24 (only ignition plugs are illustrated). Each of the fuel injection valves 22 is arranged for the corresponding cylinder, and is configured to inject fuel into, for example, the corresponding intake port 26a of an intake air passage 26. The ignition device 24 is configured to ignite an air-fuel mixture in each cylinder by the use of the spark plug arranged for each cylinder.

In the vicinity of an inlet of the intake air passage 26, an air flow sensor 28 that outputs a signal responsive to the flow rate of air taken into the intake air passage 26 is arranged. An electronically-controlled throttle valve 30 is arranged in a portion of the intake air passage 26 located on the downstream side of the air flow sensor 28. The throttle valve 30 is rotationally driven by an electric motor (for example, a stepping motor or direct current motor) which is not shown. In order to reduce cost by simplifying the configuration of the throttle valve 30, the resolution of this throttle valve 30 is reduced to a low level. In detail, the throttle valve 30 is configured so as to be able to change the throttle opening degrees in a step-wise manner among, as an example, ten selectable opening degrees with equal intervals (TA1-TA10 including a fully-closed opening degree TA1 and a fully open degree TA10). It should be noted that the number of the selectable opening degrees of a throttle valve may alternatively be a desired number that is three or more, instead of ten. Moreover, the internal combustion engine 20 is equipped with a crank angle sensor 32. The crank angle sensor 32 outputs a signal responsive to crank angle.

As others of the power devices described above, the vehicle system 10 is provided with a first motor generator (M/G1) 34 and a second motor generator (M/G2) 36 that are both electric motors that can generate an electric power. The first motor generator 34 and the second motor generator 36 are alternate current synchronous motor generators having both a function as an electric motor that outputs a torque using a supplied electric power and a function as an electric generator that transduces an inputted mechanical power into the electric power. The first motor generator 34 is mainly used as the electric generator, and the second motor generator 36 is mainly used as the electric motor.

The internal combustion engine 20, the first motor generator 34 and the second motor generator 36 are coupled to the vehicle wheels 12 via a power split device 38 and a speed reducer 40. The power split device 38 is, for example, a planetary gear unit and splits the torque (engine torque Te) outputted from the internal combustion engine 20 into torques of the first motor generator 34 and the vehicle wheels 12. The torque outputted from the internal combustion engine 20 or the torque (motor torque Tm) outputted from the second motor generator 36 is transmitted to the vehicle wheels 12 via the speed reducer 40. The first motor generator 34 regenerates an electric power using a torque supplied from the internal combustion engine 20 via the power split device 38. Moreover, cranking for the start-up of the internal combustion engine 20 can be performed by the use of the first motor generator 34 that functions as an electric motor.

The first motor generator 34 and the second motor generator 36 each perform the supply and receipt of the electric power with a battery 46 via an inverter 42 and a converter 44. The inverter 42 converts the electric power stored in the battery 46 from direct current (DC) to alternating current (AC) to supply the second motor generator 36 with this AC, and converts the electric power generated by the first motor generator 34 from AC to DC to store the battery 46. As a result, the battery 46 is charged with the electric power generated by the first motor generator 34 or the second motor generator 36, and the electric power stored in the battery 46 is discharged when it is consumed by the first motor generator 34 or the second motor generator 36. Moreover, a battery temperature sensor 48 that outputs a signal responsive to the battery temperature is attached to the battery 46.

The vehicle system 10 according to the present embodiment is provided with a control device 50 for controlling a vehicle (power train) that includes the internal combustion engine 20, the first motor generator 34 and the second motor generator 36. The control device 50 is an electronic control unit (ECU) that includes at least one processor, at least one memory, and an input/output interface.

The input/output interface receives sensor signals from various sensors attached to the internal combustion engine 20 and the hybrid vehicle on which the internal combustion engine 20 is mounted, and also outputs actuating signals to various actuators for controlling the operation of the internal combustion engine 20 and the hybrid vehicle. The various sensors described above include an SOC sensor 52, an accelerator position sensor 54 and a vehicle speed sensor 56 in addition to the air flow sensor 28, the crank angle sensor 32 and the battery temperature sensor 48 that are described above. The SOC sensor 52 is arranged to detect a charging rate (i.e., SOC: State Of Charge) of the battery 46. The accelerator position sensor 54 outputs a signal responsive to depression amount (i.e., accelerator position) of an accelerator pedal of the hybrid vehicle. The vehicle speed sensor 56 outputs a signal responsive to the vehicle speed of the hybrid vehicle. The control device 50 can calculate an engine speed NE by the use of the signal of the crank angle sensor 32.

Furthermore, the various actuators described above include the fuel injection valves 22, the ignition device 24, the throttle valve 30, the first motor generator 34 and the second motor generator 36. In the memory of the control device 50, various programs and various data (including maps) for controlling the hybrid vehicle are stored. The processor executes the programs stored in the memory. As a result, various functions of the control device 50 (such as, various engine controls and motor generator control) are achieved. In more detail, the control device 50 is configured including, as function blocks, a required throttle opening degree setting component 58 and a throttle opening degree selecting component 60 described below. It should be noted that the control device 50 may alternatively be configured with a plurality of ECUs. In addition, in the present embodiment, the throttle opening degree selecting component 60 corresponds to an example of the "first throttle opening degree selecting component" according to one aspect of the present disclosure.

1-2. Control of Vehicle System 1-2-1. Calculation of Required Throttle Opening Degree The vehicle system 10 is a system of the hybrid vehicle that includes both of the internal combustion engine 20 and the electric motor (second motor generator 36) as its power devices. The control device 50 determines, as follows, a required engine torque and a required motor torque that are the respective required values of engine torque Te and motor torque Tm. That is to say, the control device 50 calculates a required driving force required for the vehicle, on the basis of the accelerator position, and determines the required engine torque and the motor torque on the basis of the calculated required driving force.

The required throttle opening degree setting component 58 sets a required throttle opening degree required for the vehicle. In detail, the control device 50 calculates a required intake air flow rate that is required to achieve the required engine torque determined as described above. Also, the required throttle opening degree setting component 58 calculates a required throttle opening degree as a throttle opening degree that is required to achieve the calculated required intake air flow rate. In this way, the required throttle opening degree depending on an engine torque request which the vehicle receives from the driver via the accelerator pedal corresponds to an example of "the required throttle opening degree required for the vehicle" mentioned here. In addition, since the required throttle opening degree corresponds to an ideal throttle opening degree associated with the required engine torque, hereunder, it is also referred to as a "required throttle opening degree TA_true".

1-2-2. Issue Associated with Decrease of Resolution of Throttle Opening Degree

Figure 2:
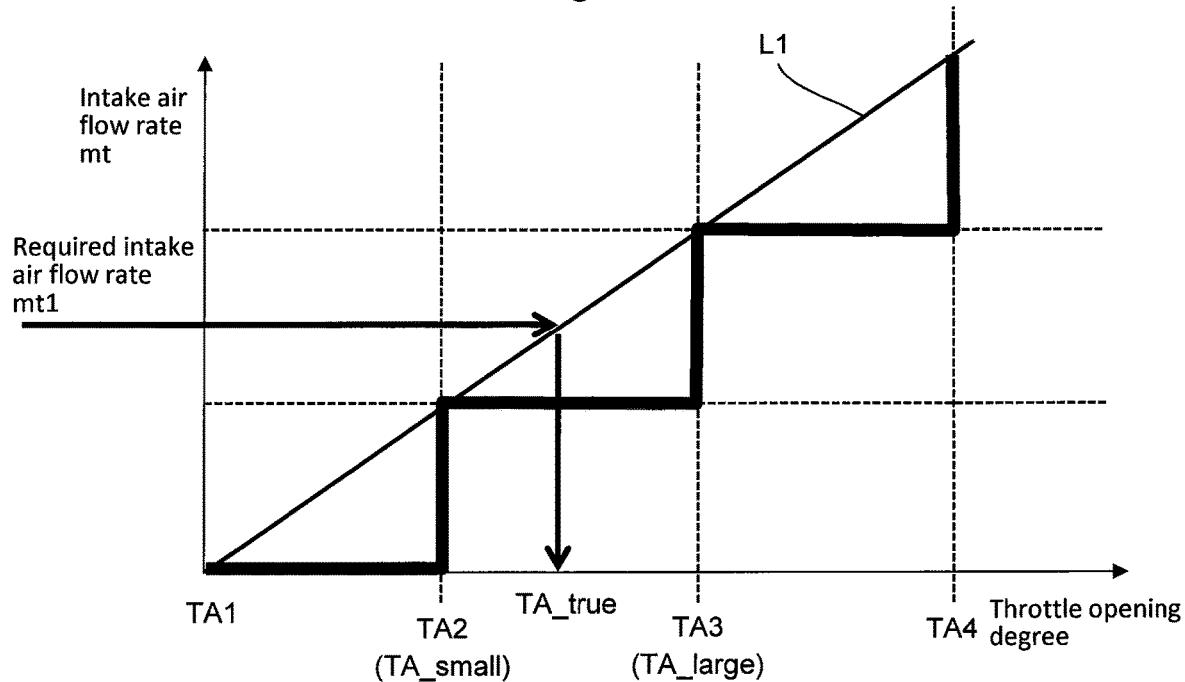
FIG. 2 is a graph for describing an issue associated with a decrease of the resolution of a throttle opening degree.

FIG. 2 is a graph for describing an issue associated with a decrease of the resolution of the throttle opening degree. The vertical axis of FIG. 2 denotes an intake air flow rate (more specifically, throttle-valve-passing-through flow rate) mt, and the horizontal axis thereof denotes the throttle opening degree. According to the throttle valve 30 in which the resolution of the throttle opening degree is reduced to a low level as described above, the number of the selectable opening degrees is limited in accordance with the resolution. In FIG. 2, a part (TA1-TA4) of ten selectable opening degrees of the throttle valve 30 is represented.

In an example of a throttle valve configured to be able to change the throttle opening degrees in a substantially stepless manner since the resolution of the throttle opening degree is sufficiently high, a relationship between the intake air flow rate mt and the throttle opening degree is represented as in a straight line L1 shown in FIG. 2. In contrast to this, if the number of the selectable opening degrees is limited as in the throttle valve 30, the required throttle opening degree TA_true may become difficult to coincide with a selectable opening degree and the difference between the required throttle opening degree TA_true and a selectable opening degree around the required throttle opening degree TA_true may increase.

Here, a selectable opening degree that is greater than the required throttle opening degree TA_true and is the closest thereto is referred to as a "first throttle opening degree TA_large", and a selectable opening degree that is smaller than the required throttle opening degree TA_true and is the closest thereto is referred to as a "second throttle opening degree TA_small". In a throttle control, it is required to select either one of the first throttle opening degree TA_large and the second throttle opening degree TA_small even if the difference described above is great.

According to the example shown in FIG. 2, although a required intake air flow rate mt1 associated with the required engine torque is commanded, the required throttle opening degree TA_true associated with this required intake air flow rate mt1 does not coincide with any of the selectable opening degrees and is located between two selectable opening degree TA3 (=TA_large) and selectable opening degree TA2 (=TA_small). If the selectable opening degree TA3 is selected in this example, an engine torque Te that is higher than the engine torque Te associated with the required throttle opening degree TA_true is generated. If, on the other hand, the selectable opening degree TA2 is selected, only an engine torque Te that is lower than the engine torque Te associated with the required throttle opening degree TA_true becomes possible to be generated. Because of this, if the resolution of the throttle opening degree is lowered to reduce cost, it is favorable to be able to select, among the selectable opening degrees, an appropriate throttle opening degree depending on the condition of the vehicle.

1-2-3. Outline of Throttle Control

First, if the required throttle opening degree TA_true coincides with either one of the selectable opening degrees (TA1-TA10), the throttle opening degree selecting component 60 selects, as a target opening degree of the throttle control, a selectable opening degree that coincides with the required throttle opening degree TA_true. If, on the other hand, the required throttle opening degree TA_true does not coincide with any of the selectable opening degrees (TA1-TA10), in view of the issue described above, the throttle opening degree selecting component 60 selects, as a target opening degree, one throttle opening degree among the selectable opening degrees (TA1-TA10) in a manner described below. In addition, the target opening degree described above corresponds to a target value used when the electric motor for driving the throttle valve 30 controls the throttle opening degree. Because of this, either one of the selectable opening degrees TA1-TA10 corresponds to the target opening degree. In the present specification, as just described, the target opening degree is used separately from the required throttle opening degree TA_true that is a throttle opening degree required for the vehicle.

Figure 3:
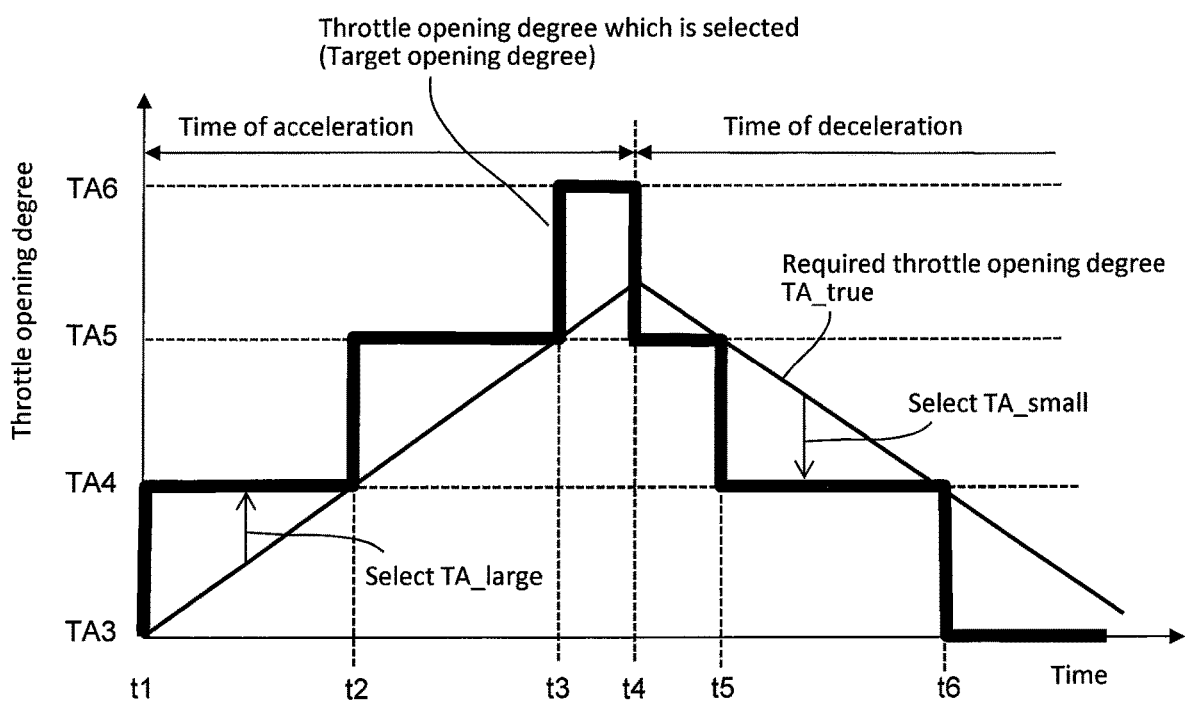
FIG. 3 is a time chart for describing the outline of a throttle control according to the first embodiment of the present disclosure.

FIG. 3 is a time chart for describing the outline of the throttle control according to the first embodiment of the present disclosure. During a time period to a time point t4 from a time point t1 in FIG. 3, the required throttle opening degree TA_true is increasing with a lapse of time. This is because the depression amount of the accelerator pedal gradually increases during this time period (t1-t4) and, as a result, the required engine torque gradually increases. That is to say, this time period (t1-t4) corresponds to "the time of acceleration of the vehicle".

In the time period (t1-t4), the required throttle opening degrees TA_true at the time points t1, t2 and t3 respectively coincide with the selectable opening degrees TA3, TA4 and TA5. On the other hand, at timings in the time period (t1-t4) excluding these time points t1 to t3, the required throttle opening degree TA_true does not coincide with any of the selectable opening degrees.

Based on the above, during, for example, a time period to the time point t2 from the time point t1, contrary to the example shown in FIG. 3, the selectable opening degree TA3 may be continuously selected as the required throttle opening degree TA_true before reaching the time point t2 even after the time point t1. However, contrary to this kind of example, the throttle opening degree selecting component 60 according to the present embodiment selects the first throttle opening degree TA_large (i.e., a selectable opening degree that is greater than the required throttle opening degree TA_true and is the closet thereto) at the time of acceleration of the vehicle as in the time period (t1-t4). As a result, at the time of the required throttle opening degree TA_true increasing associated with an increase of the depression amount of the accelerator pedal as in the time period (t1-t4), a selectable opening degree greater by one step than the previously selected throttle opening degree is selected as shown in FIG. 3 when the required throttle opening degree TA_true becomes greater than a selectable opening degree.

On the other hand, during a time period after the time point t4 shown in FIG. 3, the required throttle opening degree TA_true decreases with a lapse of time. This is because the depression amount of the accelerator pedal is gradually decreasing during this time period and, as a result, the required engine torque gradually decreases. That is to say, this time period corresponds to "the time of deceleration of the vehicle".

At the time of deceleration of the vehicle as in the time period after the time point t4 shown in FIG. 3, the throttle opening degree selecting component 60 selects the second throttle opening degree TA_small (i.e., a selectable opening degree that is smaller than the required throttle opening degree TA_true and is the closest thereto). Because of this, according to the example shown in FIG. 3, after the time point t4, the selectable opening degree TA5 smaller by one step than the previously selected throttle opening degree (TA6) is selected. This selection of the selectable opening degree TA5 is continued until the required throttle opening degree TA_true becomes equal to the selectable opening degree TA5 at a time point t5. Similarly, thereafter, changing to a selectable opening degree smaller by one step than the previously selected throttle opening degree is performed after each of the time points t5 and t6.

1-2-4. Processing of Control Device Concerning Control of Vehicle System

Figure 4:
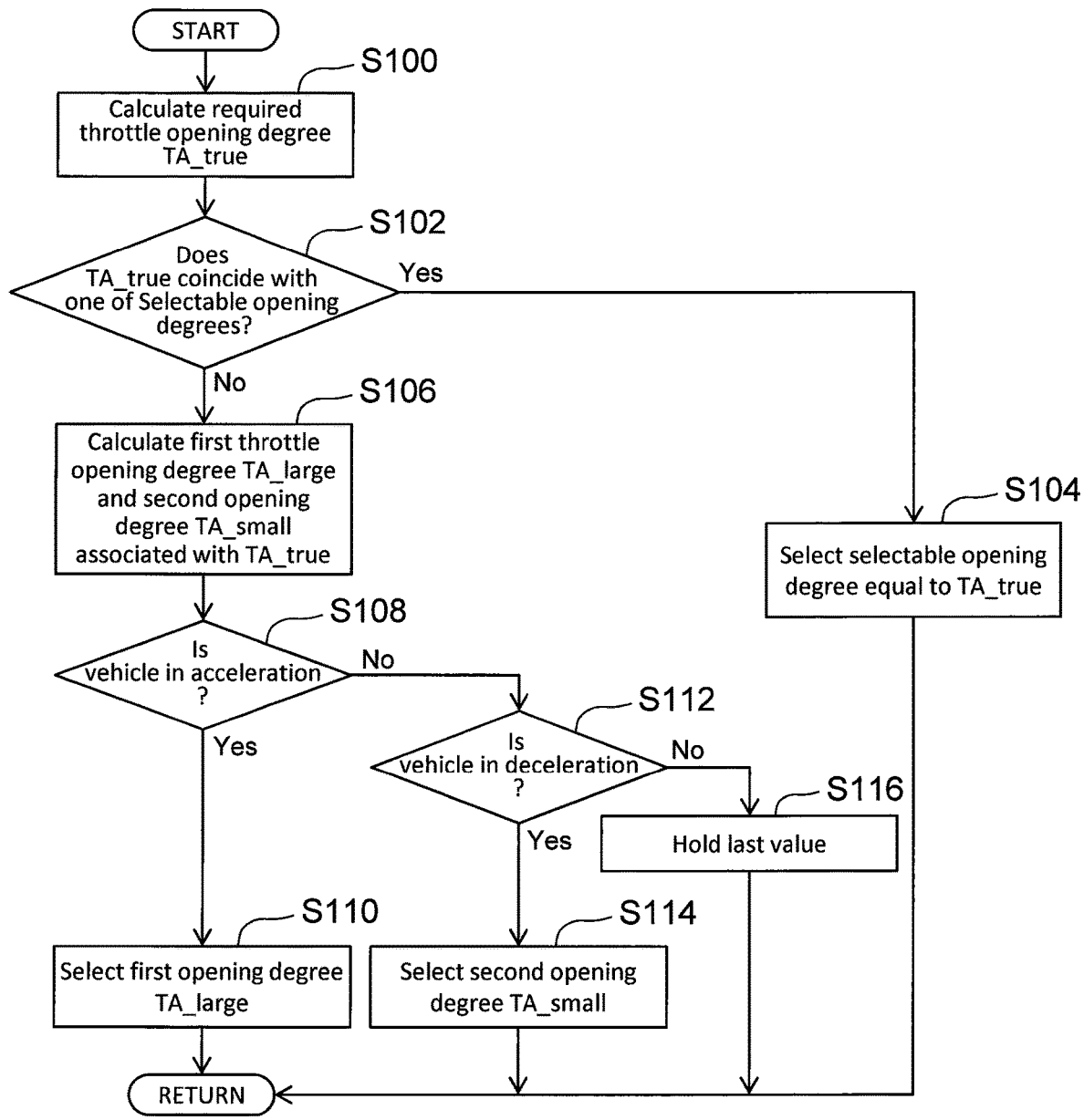
FIG. 4 is a flow chart that illustrates a routine of the processing concerning control of the vehicle system according to the first embodiment of the present disclosure.

FIG. 4 is a flow chart that illustrates a routine of the processing concerning the control of the vehicle system 10 according to the first embodiment of the present disclosure. The control device 50 repeatedly executes the processing according to the present routine at a designated interval during operation of the internal combustion engine 20.

According to the routine shown in FIG. 4, first, in step S100, the control device 50 calculates an ideal required throttle opening degree TA_true associated with the required engine torque based on the operation of the accelerator pedal. In more detail, the processing of step S100 is executed by the required throttle opening degree setting component 58.

Then, in step S102, the control device 50 determines whether or not the calculated required throttle opening degree TA_true coincides with either one of the selectable opening degrees (TA1-TA10) of the throttle valve 30. In more detail, the processing of steps S102 and S104 to S116 is executed by the throttle opening degree selecting component 60.

If the required throttle opening degree TA_true coincides with either one of the selectable opening degrees (TA1-TA10) in step S102, the processing proceeds to step S104. In step S104, the control device 50 selects, as a target opening degree of the throttle control, a selectable opening degree that coincides with the required throttle opening degree TA_true.

If, on the other hand, the required throttle opening degree TA_true does not coincide with any of the selectable opening degrees (TA1-TA10) in step S102, the processing proceeds to step S106. In step S106, the control device 50 calculates the first throttle opening degree TA_large and the second throttle opening degree TA_small that are associated with the required throttle opening degree TA_true calculated in step S100.

Then, in step S108, the control device 50 determines whether the vehicle is in acceleration or not. In detail, a time of the vehicle actually accelerating and a time of the depression amount of the accelerator pedal increasing each correspond to "the time of acceleration of the vehicle" mentioned here. Because of this, whether the vehicle is in acceleration or not can be determined by the use of, for example, the vehicle speed sensor 56 and the accelerator position sensor 54. If the control device 50 determines in step S108 that the vehicle is in acceleration, the processing proceeds to step S110. In step S110, the control device 50 selects the first throttle opening degree TA_large as a target opening degree of the throttle control.

If, on the other hand, the control device 50 determines in step S108 that the vehicle is not in acceleration, the processing proceeds to step S112. In step S112, the control device 50 determines whether the vehicle is in deceleration or not. In detail, a time of the vehicle actually decelerating and a time of the depression amount of the accelerator pedal decreasing each correspond to "the time of deceleration of the vehicle" mentioned here. Because of this, whether the vehicle is in deceleration or not can be determined by the use of, for example, the vehicle speed sensor 56 and the accelerator position sensor 54.

It should be noted that another example of the time of deceleration may include a time of a brake pedal of the vehicle being depressed. To be more specific, according to the vehicle system 10 of the present embodiment, where the brake pedal is depressed, the required engine torque is made zero to perform an engine stop, and thus, a fully closed opening degree (TA1) is calculated as the required throttle opening degree TA_true. However, in, for example, a system in which, even if the brake pedal is depressed, the required engine torque is made zero not immediately but with a certain delay, it may be determined that the vehicle is in deceleration when a depression of the brake pedal is detected using a brake sensor (not shown).

If the control device 50 determines in step S112 that the vehicle is in deceleration, the processing proceeds to step S114. In step S114, the control device 50 selects the second throttle opening degree TA_small as a target opening degree of the throttle control.

If, on the other hand, the control device 50 determines in step S112 that the vehicle is not in deceleration, the processing proceeds to step S116. In step S116, the control device 50 holds the last value (first throttle opening degree TA_large or second throttle opening degree TA_small) of the target opening degree of the throttle control.

1-3. Advantageous Effects

If the required throttle opening degree TA_true does not coincide with any of the selectable opening degrees (TA1-TA10), it is conceivable to select, as a target opening degree, one of the selectable opening degrees that is closer to the required throttle opening degree TA_true. However, if this kind of control example is adopted, there is a concern that, since the second throttle opening degree TA_small is possibly selected at the time of acceleration, the engine torque Te may not be properly generated even at the time of the acceleration (that is, even when a high engine torque Te is required). Contrary to this, there is a concern that, since the first throttle opening degree TA_large is possibly selected at the time of deceleration, the engine torque Te may not be properly lowered even at the time of the deceleration. Because of this, acceleration or deceleration of the vehicle may become slower.

In contrast to this, according to the throttle control of the present embodiment described so far, it is determined which of the selectable opening degrees is selected, in consideration of the condition of the vehicle (in detail, acceleration or deceleration of the vehicle). More specifically, at the time of acceleration, the first throttle opening degree TA_large is selected, and, on the other hand, at the time of deceleration, the second throttle opening degree TA_small is selected. As a result, even where, since the resolution of the throttle opening degree is low, any of the selectable opening degrees (TA1-TA10) do not coincide with the required throttle opening degree TA_true, a proper throttle opening degree with respect to the acceleration or deceleration of the vehicle can be selected. Because of this, acceleration and deceleration with a high responsiveness can be achieved while lowering the resolution of the throttle opening degree to reduce cost.

1-4. Other Examples of Vehicle System

According to the first embodiment described above, the power-split hybrid vehicle that can freely combine or divide the torques from the internal combustion engine 20, the first motor generator 34 and the second motor generator 36 is taken as an example. However, hybrid types of vehicles to which the throttle control according to the first embodiment is applied may be other types other than the torque split type. For example, a so-called parallel type that uses both of an internal combustion engine and a motor generator for driving of the vehicle wheels may alternatively be adopted. In addition, for example, a so-called series type that uses an internal combustion engine only for performing electric power generation and that uses a motor generator for driving the vehicle wheels and performing regenerative power generation may alternatively be adopted. Additionally, in an example of the series type, since the engine torque Te is not directly transmitted to the vehicle wheels, the feeling of acceleration and deceleration is not directly affected by the magnitude of the engine torque Te. However, if there is no correlation between the acceleration/deceleration of the vehicle and the engine sound (i.e., if the engine sound does not increase in association with the acceleration or the engine sound does not decrease in association with the deceleration), a feeling of unease or an uncomfortable feeling may be given to the driver. According to the throttle control of the first embodiment, a good correlation between the acceleration/deceleration of the vehicle and the engine sound can be achieved also in the example of the series type.

Furthermore, vehicles to which the throttle control according to the first embodiment is applied is not limited to the hybrid vehicles, and may alternatively be a vehicle on which only an internal combustion engine is mounted as its power device for driving the vehicle wheels.

2. Second Embodiment

Then, a second embodiment according to the present disclosure will be described with reference to FIG. 5. In the following explanation, it is supposed that the configuration shown in FIG. 1 is used as an example of the hardware configuration of the vehicle system according to the second embodiment. This also applies to third to fifth embodiments described below.

2-1. Control of Vehicle System

The control according to the present embodiment is different from the control according to the first embodiment described above in terms of a "first driving force adjustment control" and a "second driving force adjustment control" described below being additionally executed. In detail, according to the throttle control according to the first embodiment, acceleration or deceleration with a high responsiveness can be achieved while lowering the resolution of the throttle opening degree to reduce cost.

However, according to the throttle control of the first embodiment, under the condition that the required throttle opening degree TA_true does not coincide with any of the selectable opening degrees (TA1-TA10), excess or shortage of the engine torque Te with respect to the required engine torque may occur due to selection of the first throttle opening degree TA_large or the second throttle opening degree TA_small by the throttle opening degree selecting component 60. More specifically, if the first throttle opening degree TA_large is selected, the engine torque Te may become too high, and, if the second throttle opening degree TA_small is selected, the engine torque Te may become insufficient. The control device 50 is configured to control the engine torque Te and the motor torque Tm such that the required driving force required for the vehicle is met. Because of this, where excess or shortage of the engine torque Te occurs, an excess or shortage of the driving force of the vehicle also occurs.

Therefore, according to the present embodiment, in order to decrease excess or shortage of the engine torque Te described above, the control device 50 executes the first driving force adjustment control and the second driving force adjustment control. To be more specific, according to the first driving force adjustment control, where excess or shortage of the engine torque Te due to the selection of the first throttle opening degree TA_large or the second throttle opening degree TA_small by the throttle opening degree selecting component 60 occurs, the motor torque Tm is adjusted such that the driving force of the vehicle approaches the required driving force. In addition, according to the second driving force adjustment control, where excess of the engine torque Te due to the selection of the first throttle opening degree TA_large by the throttle opening degree selecting component 60 occurs, the power generation load of the first motor generator 34 is adjusted such that the driving force of the vehicle approaches the required driving force.

It should be noted that, according to the present embodiment, the second motor generator 36 corresponds to an example of the "electric motor" according to the present disclosure, and the first motor generator 34 corresponds to an example of the "electric generator" according to the present disclosure.

2-1-1. Processing of Control Device Concerning Control of Vehicle System

Figure 5:
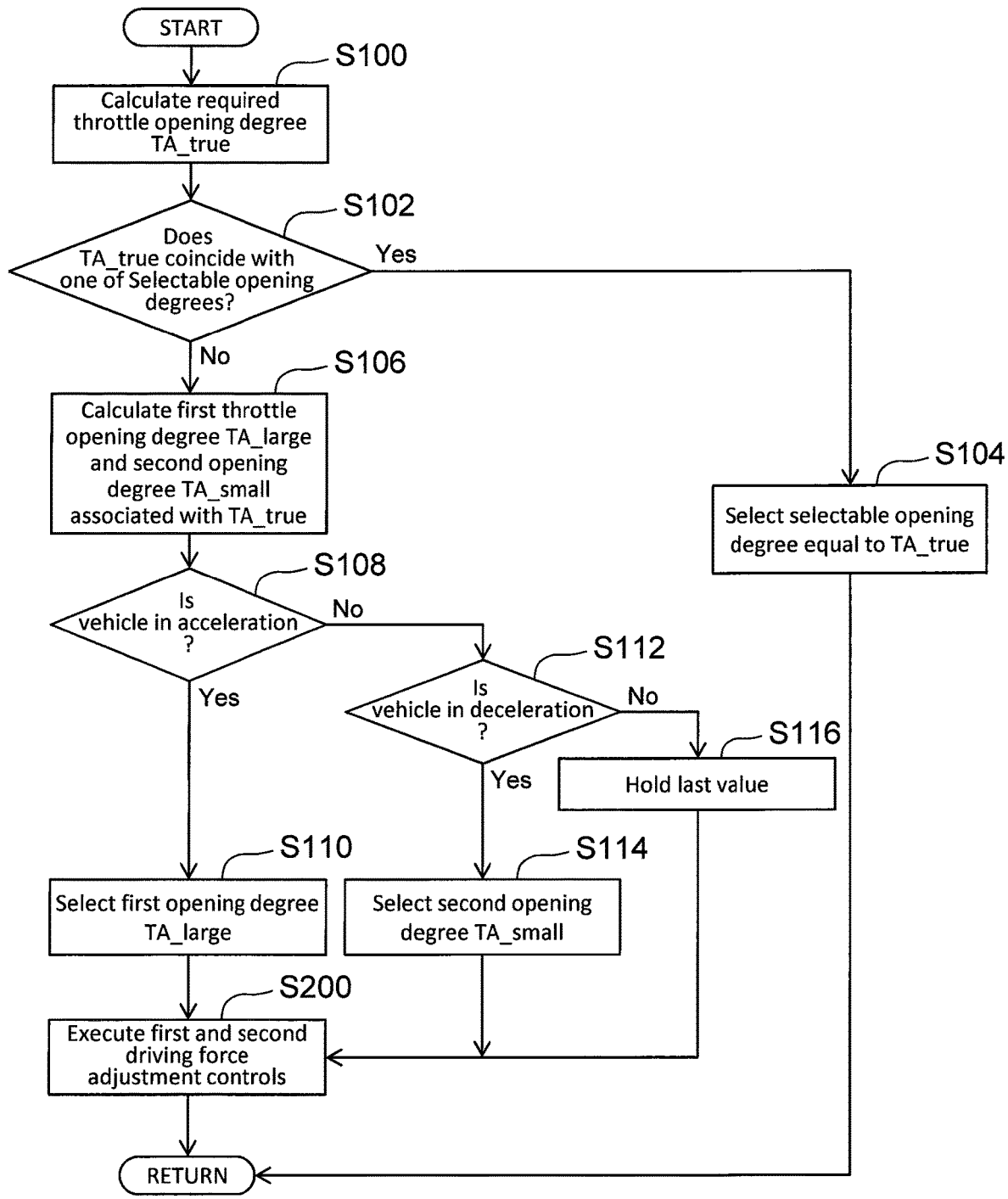
FIG. 5 is a flow chart that illustrates a routine of the processing concerning control of a vehicle system according to a second embodiment of the present disclosure.

FIG. 5 is a flow chart that illustrates a routine of the processing concerning the control of the vehicle system 10 according to the second embodiment of the present disclosure. The processing of steps S100 to S116 in the routine shown in FIG. 5 is as already described in the first embodiment. This also applies to routines shown in FIGS. 7, 8, 11 and 12 described below.

According to the routine shown in FIG. 5, after the processing of steps S110, S114 or S116, the processing proceeds to step S200. In step S200, the control device 50 executes the first and second driving force adjustment controls described above.

Specifically, first, the control device 50 calculates the engine torque Te associated with the current selectable opening degree (TA_large or TA_small). This kind of calculation can be performed by using, for example, a calculation procedure opposite to the calculation procedure of the required throttle opening degree TA_true based on the required engine torque described above. On that basis, the difference between the engine torque Te calculated in this way and the required engine torque corresponds to the excess or shortage of the engine torque Te described above.

According to the first driving force adjustment control, where the first throttle opening degree TA_large is selected, the motor torque Tm (i.e., torque of the M/G2) is decreased such that the driving force of the vehicle is decreased by a value equivalent to the excess of the engine torque Te. Where, on the other hand, the second throttle opening degree TA_small is selected, the motor torque Tm is increased such that the driving force of the vehicle is increased by a value equivalent to the shortage of the engine torque Te. In addition, in order to cause the driving force of the vehicle to approach the required driving force, decrease of the excess of the engine torque Te using the second driving force adjustment control is performed as follows, for example. That is to say, the power generation load of the first motor generator (M/G1) is increased to absorb the above-described excess of the engine torque Te. The control device 50 may alternatively perform the decrease of the excess of the engine torque Te while, in accordance with various conditions of the vehicle (for example, SOC of the battery 46), properly and selectively using the first driving force adjustment control and the second driving force adjustment control or properly combining the both controls.

2-2. Advantageous Effects

As described so far, according to the present embodiment, during execution of the same throttle control as the first embodiment, the first and second driving force adjustment controls described above are executed. As a result, the control device 50 can execute the above-described throttle control while reducing the occurrence of excess of shortage of the driving force of the vehicle at the time of acceleration or deceleration.

2-3. Other Examples of Vehicle System

In the second embodiment described above, in order to adjust the driving force of the vehicle in response to the execution of the throttle control described above, both of the first and second driving force adjustment controls are used. Instead of this kind of example, only one of the first and second driving force adjustment controls may be used. Moreover, the first driving force adjustment control may be used in a parallel type hybrid vehicle, instead of the vehicle system 10 of the power-split type described above. Furthermore, the second driving force adjustment control may be used in a series type hybrid vehicle, instead of the vehicle system 10, as long as a vehicle including an electric generator that generates an electric power using the engine torque Te and a battery that stores an electric power generated by this electric generator is used.

3. Third Embodiment

Then, a third embodiment according to the present disclosure will be described with reference to FIGS. 6 and 7.

3-1. Control of Vehicle System 3-1-1. Outline of Throttle Control

A throttle control according to the present embodiment is different from the throttle control according to the first embodiment described above in terms of the following points described with reference to FIG. 6. In addition, according to the present embodiment, the "first and second driving force adjustment controls" are executed similarly to the second embodiment.

As a premise, the control device 50 uses a charging power upper limit value Win in order to prevent overcharge of the battery 46. In detail, the control device 50 executes, using the first motor generator 34, regenerative power generation using the engine torque Te, within a range in which the input electric voltage of the battery 46 does not exceed the charging power upper limit value Win. This charging power upper limit value Win is not a constant value and changes in accordance with, for example, the battery temperature and the SOC of the battery 46. In detail, in the same SOC, the lower the battery temperature is, the smaller the charging power upper limit value Win basically becomes. In addition, in the same battery temperature, the higher the SOC is, the smaller the charging power upper limit value Win basically becomes.

Figure 6:
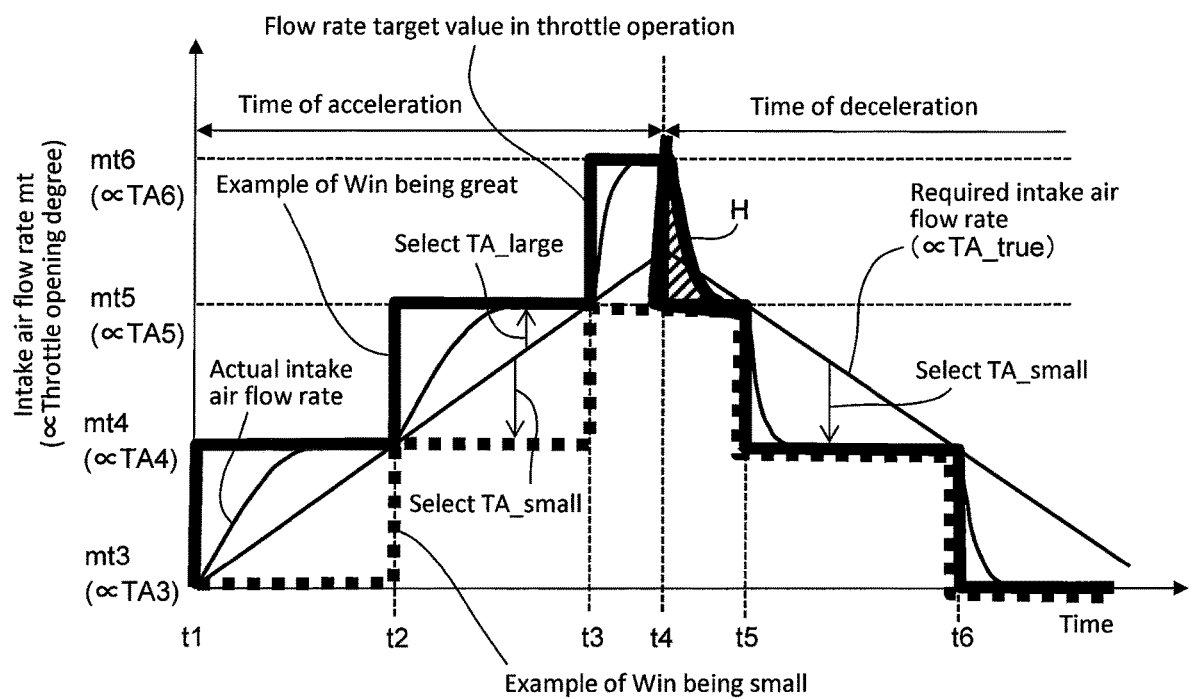
FIG. 6 is a time chart for describing a throttle control according to a third embodiment of the present disclosure.

FIG. 6 is a time chart for describing the throttle control according to the third embodiment of the present disclosure.

In order to indicate actual intake air flow rate as well as the throttle opening degree, the intake air flow rate mt is used as the vertical axis of FIG. 6. Intake air flow rates mt3-mt6 shown in FIG. 6 are associated with the selectable opening degrees TA3-TA6, respectively. In addition, instead of the required throttle opening degree TA_true, the required intake air flow rate that is proportional to the required throttle opening degree TA_true is indicated.

The throttle control according to the present embodiment is configured in consideration of a constraint of the battery 46. In this throttle control, the manner of selection of the throttle opening degree is changed in accordance with whether or not the charging power upper limit value Win is greater than a designated threshold value TH1. This threshold value TH1 corresponds to an example of the "first threshold value" according to the present disclosure.

Specifically, the throttle control performed when the charging power upper limit value Win is greater than the threshold value TH1 is the same as the throttle control according to the first embodiment. Thus, at the time of acceleration, the first throttle opening degree TA_large is selected, and, at the time of deceleration, the second throttle opening degree TA_small is selected. A waveform with a step-wise solid line shown in FIG. 6 indicates a waveform of the intake air flow rate mt (i.e., a flow rate target value in the throttle operation) associated with this kind of selection of the throttle opening degree. As a result of the adjustment of the throttle opening degree, the actual intake air flow rate is reached to any one of the intake air flow rates mt3-mt6 with a response delay as shown in FIG. 6.

If, on the other hand, the charging power upper limit value Win becomes smaller than or equal to the threshold value TH1 due to a reason, such as low battery temperature, the second throttle opening degree TA_small is selected without regard to whether the vehicle is in acceleration or in deceleration, contrary to the throttle control according to the first embodiment. A waveform with a step-wise broken line shown in FIG. 6 indicates a waveform of the intake air flow rate mt associated with this kind of selection of the throttle opening degree.

3-1-2. Processing of Control Device Concerning Control of Vehicle System

Figure 7:
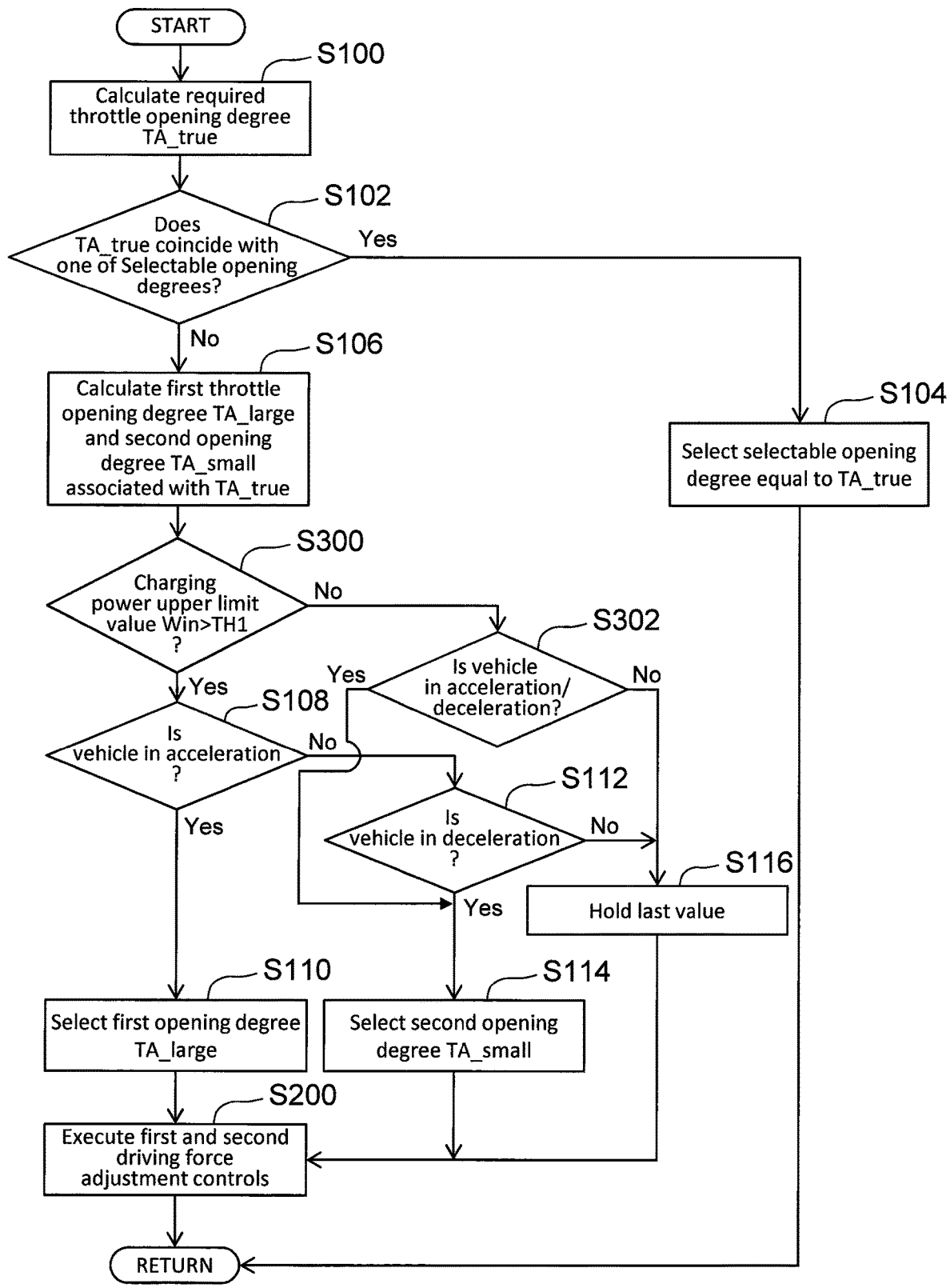
FIG. 7 is a flow chart that illustrates a routine of the processing concerning control of a vehicle system according to the third embodiment of the present disclosure.

FIG. 7 is a flow chart that illustrates a routine of the processing concerning the control of the vehicle system 10 according to the third embodiment of the present disclosure.

According to the routine shown in FIG. 7, after the calculation processing of the first throttle opening degree TA_large and the second throttle opening degree TA_small in step S106, the processing proceeds to step S300. In step S300, the control device 50 (throttle opening degree selecting component 60) determines whether or not the charging power upper limit value Win is greater than the threshold value TH1 described above. The control device 50 stores a map (not shown) that defines a relationship of the charging power upper limit value Win with respect to the battery temperature and the SOC, and calculates, from this kind of map, the charging power upper limit value Win depending on the battery temperature and the SOC.

If the determination result of step S300 is positive (Win>TH1), the processing proceeds to step S108. Because of this, the first throttle opening degree TA_large or the second throttle opening degree TA_small is selected, in steps S108 to S114, in accordance with whether the vehicle is in acceleration or in deceleration.

If, on the other hand, the determination result of step S300 is negative (Win≤TH1), the processing proceeds to step S302. In step S302, the control device 50 (throttle opening degree selecting component 60) determines whether the vehicle is in acceleration/deceleration or not. As a result, if this determination result is negative, the processing proceeds to step S116. In addition, if this determination result is positive, the processing proceeds to step S114. As a result, in any of the time of acceleration and the time of the deceleration, the second throttle opening degree TA_small is selected in step S114.

3-2. Advantageous Effects

In FIG. 6, excess and shortage of the intake air flow rate with respect to the required intake air flow rate at the time of acceleration/deceleration are indicated. Excess or shortage of the engine torque Te due to this excess or shortage of the actual intake air flow rate can be basically coped with the first and second driving force adjustment controls described above. When the second driving force adjustment control is executed to decrease the excess of the engine torque Te, there is an issue as described below. That is to say, if the charging power upper limit value Win is small, the charging of the battery 46 is restricted. Because of this, the regenerative power generation by the first motor generator 34 may no longer be performed sufficiently in order to decrease the excess of the engine torque Te. Thus, if the first throttle opening degree TA_large is selected at the time of acceleration without regard to the magnitude of the charging power upper limit value Win, there is a concern that, when the charging power upper limit value Win is small, the excess of the engine torque Te may no longer be decreased immediately after elapse of the time point t4 of making the transition from acceleration to deceleration (see a hatching portion H in FIG. 6). As a result, there is a concern that a feeling of free running (i.e., a feeling of the vehicle running without deceleration) may be given to the driver.

In view of the issue described above, according to the throttle control of the present embodiment, where the charging power upper limit value Win is small, the second throttle opening degree TA_small is selected even at the time of acceleration. As a result, the occurrence of the excess of the engine torque Te can be reduced immediately after the transition from acceleration to deceleration. This can prevent the above-described feeling of free running from being given to the driver.

3-3. Other Examples of Vehicle System

The throttle control according to the third embodiment described above can be applied to a vehicle including an electric generator that generates an electric power using the engine torque Te and a battery that stores an electric power generated by this electric generator (for example, a series type hybrid vehicle), instead of the vehicle system 10. In addition, at least one of the first and second driving force adjustment controls according to the second embodiment may be combined with the throttle control according to the third embodiment.

4. Fourth Embodiment

Then, a fourth embodiment according to the present disclosure will be described with reference to FIG. 8.

4-1. Control of Vehicle System 4-1-1. Outline of Throttle Control

The throttle control according to the present embodiment is different from the throttle control according to the first embodiment described above in terms of the following points.

That is to say, according to the present embodiment, at the time of deceleration, which of the first throttle opening degree TA_large and the second throttle opening degree TA_small is selected is determined on the basis of the magnitude of the SOC of the battery 46 (i.e., the degree of a charging request), instead of the second throttle opening degree TA_small being constantly selected. In detail, where the SOC is lower than a designated threshold value TH2 (i.e., where the charging request is relatively high), the first throttle opening degree TA_large is selected even at the time of deceleration. It should be noted that the threshold value TH2 corresponds to an example of the "second threshold value" according to the present disclosure.

Moreover, according to the present embodiment, at the time of acceleration, which of the first throttle opening degree TA_large and the second throttle opening degree TA_small is selected is determined on the basis of the magnitude of the SOC (i.e., on the basis of whether the battery 46 is in a substantially fully-charged state), instead of the first throttle opening degree TA_large being constantly selected. In detail, where the SOC is higher than a designated threshold value TH3 (i.e., where the charging request is relatively low), the second throttle opening degree TA_small is selected even at the time of acceleration. It should be noted that the threshold value TH3 corresponds to an example of the "third threshold value" according to the present disclosure.

4-1-2. Processing of Control Device Concerning Control of Vehicle System

Figure 8:
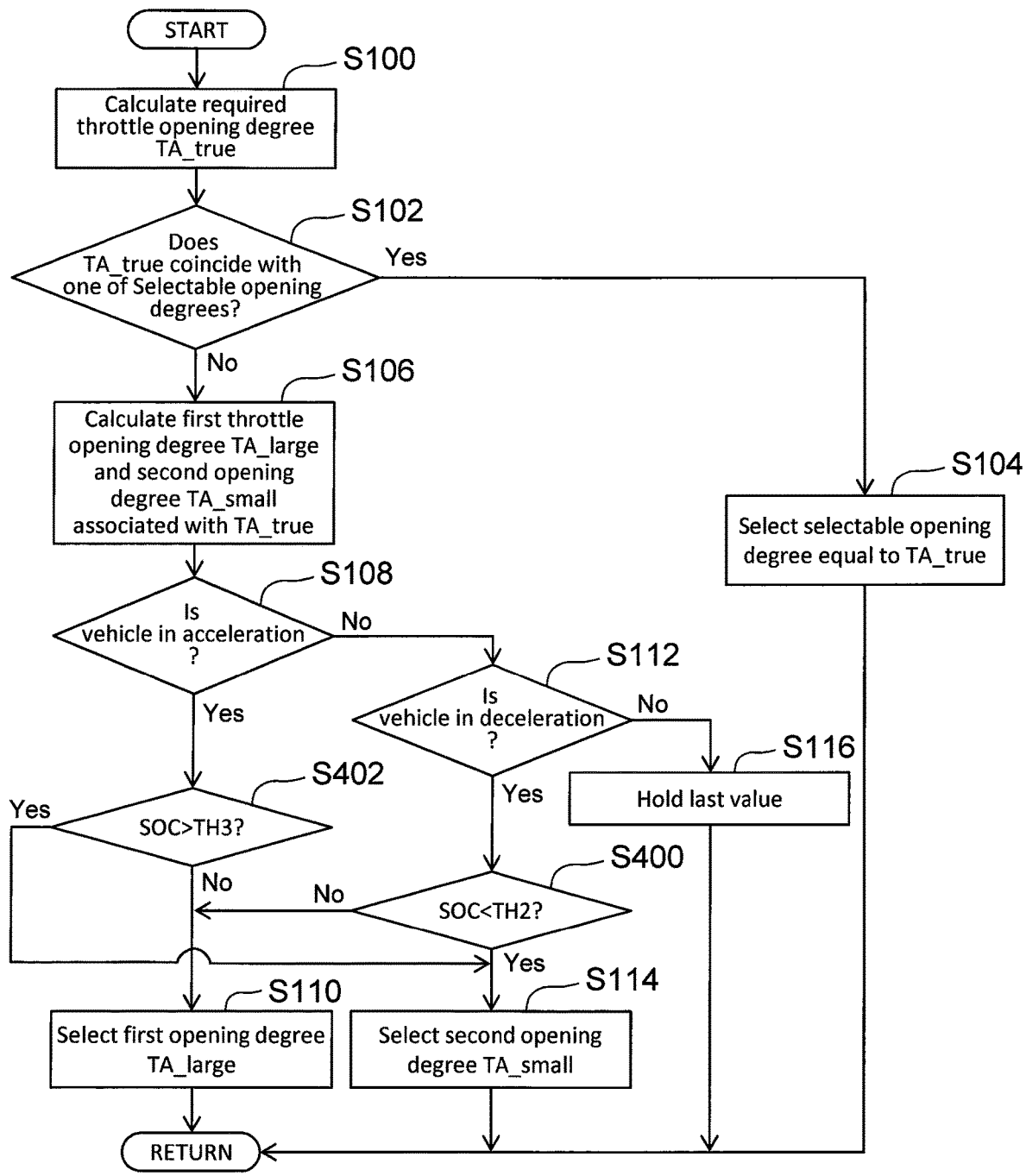
FIG. 8 is a flow chart that illustrates a routine of the processing concerning control of a vehicle system according to a fourth embodiment of the present disclosure.

FIG. 8 is a flow chart that illustrates a routine of the processing concerning the control of the vehicle system 10 according to the fourth embodiment of the present disclosure.

According to the routine shown in FIG. 8, after the control device 50 determines in step S112 that the vehicle is in deceleration, the processing proceeds to step S400. In step S400, the control device 50 (throttle opening degree selecting component 60) determines whether or not the SOC is lower than the threshold value TH2 described above. The threshold value TH2 may be a desired constant value, or be changed in accordance with, for example, the battery temperature. In more detail, since, when the battery temperature is lower, the charging power upper limit value Win becomes smaller, the threshold value TH2 may be decreased when the battery temperature is lower.

If the determination result of step S400 is negative (SOC≥TH2), that is, if the charging request is relatively low (in other words, if a margin to the fully charged state of the battery 46 is relatively small), the processing proceeds to step S114. As a result, at the time of deceleration, the second throttle opening degree TA_small is selected.

If, on the other hand, the determination result of step S400 is positive (SOC<TH2), that is, if the charging request is relatively high (in other words, if a margin to the fully charged state of the battery 46 is relatively great), the processing proceeds to step S110. As a result, even at the time of deceleration, the first throttle opening degree TA_large is selected.

Moreover, according to the routine shown in FIG. 8, after the control device 50 determines in step S108 that the vehicle is in acceleration, the processing proceeds to step S402. In step S402, the control device 50 (throttle opening degree selecting component 60) determines whether or not the SOC is higher than the threshold value TH3 described above. The threshold value TH3 may be a desired constant value, or be the same as the threshold value TH2 or different from the threshold value TH2. Furthermore, the threshold value TH3 may be changed in accordance with, for example, the battery temperature. In detail, the threshold value TH3 may similarly be smaller when the battery temperature is lower.

If the determination result of step S402 is negative (SOC≤TH3), that is, if the battery 46 is not in a substantially fully charged state, the processing proceeds to step S110. As a result, at the time of acceleration, the first throttle opening degree TA_large is selected.

If, on the other hand, the determination result of step S402 is positive (SOC>TH3), that is, if the battery 46 is in a substantially fully charged state, the processing proceeds to step S114. As a result, even at the time of acceleration, the second throttle opening degree TA_small is selected.

4-2. Advantageous Effects

As already described, if there is no correlation between the acceleration/deceleration of the vehicle and the engine sound, a feeling of unease or an uncomfortable feeling may be given to the driver. In consideration of this, according to the throttle control of the present embodiment described so far, similarly to the throttle control according to the first embodiment, the selection of the first throttle opening degree TA_large or the second throttle opening degree TA_small is basically performed in accordance with whether the vehicle is in acceleration or in deceleration.

On that basis, according to the present embodiment, the magnitude of the SOC is taken into consideration with respect to the selection of the throttle opening degree. As a result, if it can be judged that the charging request is relatively high since the SOC is low, the first throttle opening degree TA_large is selected even at the time of deceleration. That is to say, priority is given to meet the charging request. If, on the other hand, it can be judged that the battery 46 is in a substantially fully charged state since the SOC is high, the second throttle opening degree TA_small is selected even at the time of acceleration. As a result, overcharge of the battery 46 is reduced. In this way, according to the present embodiment, a proper throttle opening degree that coincides with the acceleration or deceleration of the vehicle can be selected while also taking into consideration the magnitude of the SOC.

4-3. Other Examples of Vehicle System

The throttle control according to the fourth embodiment described above can be applied to a vehicle that includes an electric generator that generates an electric power using the engine torque Te and a battery that stores an electric power generated by this electric generator (for example, a series type hybrid vehicle), instead of the vehicle system 10. In addition, at least one of the first and second driving force controls according to the second embodiment may alternatively be combined with the throttle control according to the fourth embodiment.

5. Fifth Embodiment

Then, a fifth embodiment according to the present disclosure will be described with reference to FIGS. 9 to 11.

5-1. Control of Vehicle System 5-1-1. Outline of Engine Torque Decrease Control and Engine Torque Increase Control The control according to the present embodiment is different from the control according to the first embodiment in terms of the following "engine torque decrease control" and "engine torque increase control" being executed as well as the throttle control.

5-1-1-1. Engine Torque Decrease Control

Figure 9:
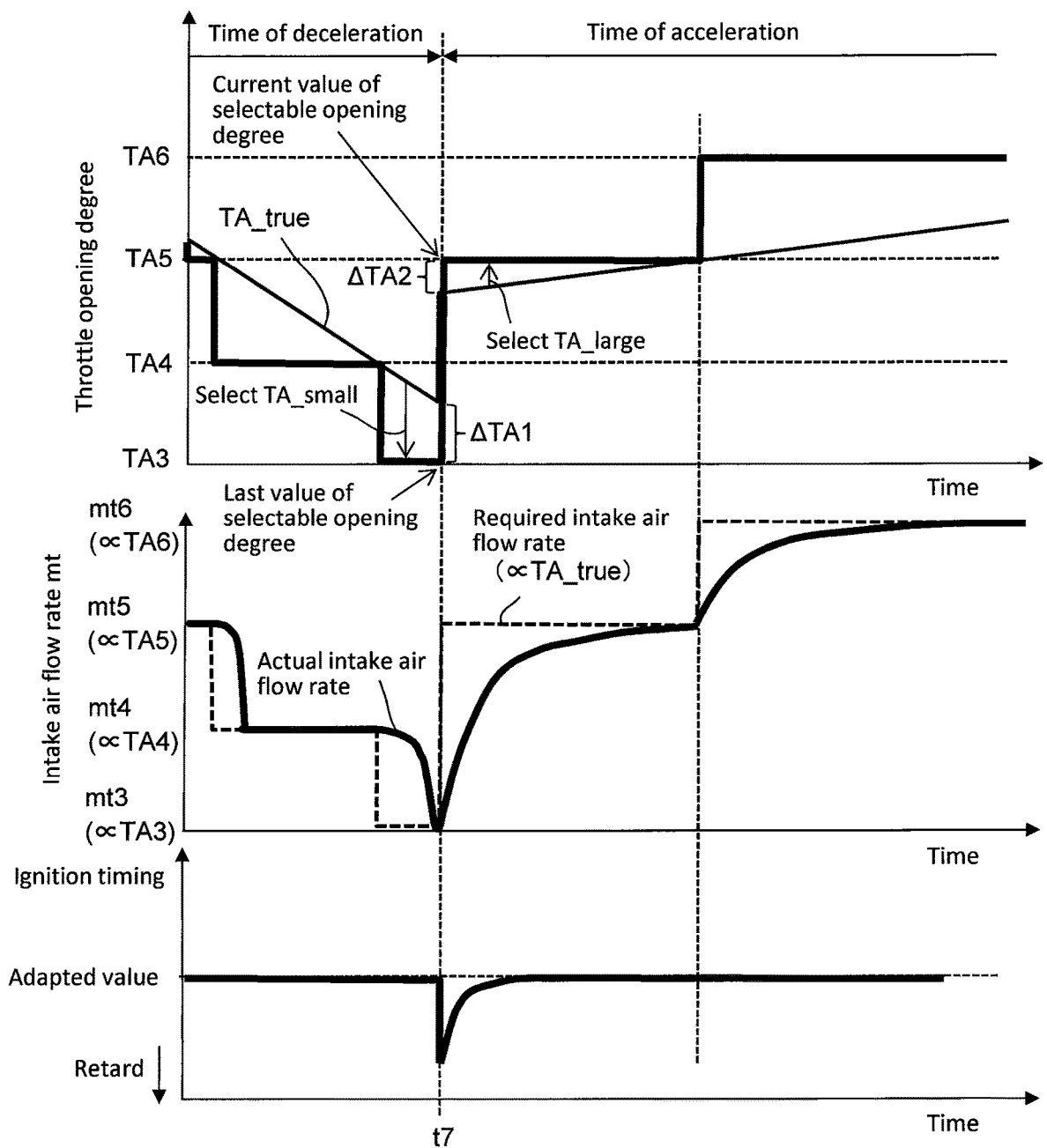
FIG. 9 is a time chart for describing an engine torque decrease control.

FIG. 9 is a time chart for describing the engine torque decrease control. According to the throttle control of the first embodiment described above, a selectable opening degree that is greater, by two or more steps, than the previously selected throttle opening degree may be selected after the second throttle opening degree TA_small is selected. As shown in FIG. 9, this kind of selection is performed, for example, when a rapid acceleration is performed after a deceleration.

In detail, according to the example shown in FIG. 9, a time period before a time point t7 is associated with the time of deceleration, and thus, the second throttle opening degree TA_small smaller than the required throttle opening degree TA_true is selected as the target opening degree. At the time point t7, an acceleration request in response to depression of the accelerator pedal is issued, and, as a result, the required throttle opening degree TA_true transitions to a value between the selectable opening degrees TA4 and TA5 from a value between the selectable opening degrees TA3 and TA4. As a result, the target opening degree of the throttle control is changed to the selectable opening degree TA5 corresponding to the first throttle opening degree TA_large selected at the time of acceleration, from the selectable opening degree TA3 corresponding to the second throttle opening degree TA_small selected at the time of deceleration. That is to say, according to this example, a selectable opening degree (TA5) greater by two steps is selected after the second throttle opening degree TA_small (TA3) is selected.

As exemplified in FIG. 9, where an acceleration request is issued after a deceleration, if a throttle opening degree greater than the first throttle opening degree TA_large (in the example shown in FIG. 9, TA4) using, as the reference, the required throttle opening degree TA_true immediately before the acceleration request is requested, the selectable opening degree becomes greater by two or more steps. As a result, the difference of the intake air flow rate mt becomes greater. In more detail, a difference of the intake air flow rate mt depending on the sum of throttle opening degree differences ΔTA1 and ΔTA2 shown in FIG. 9 is produced. This leads to a greater difference of the engine torque Te.

Therefore, according to the present embodiment, where a selectable opening degree greater by two or more steps is selected after the second throttle opening degree TA_small is selected, the engine torque decrease control is executed in order to decrease an excess Te_excess of the engine torque Te. One example of this engine torque decrease control is a retard of the ignition timing, and, according to the example shown in FIG. 9, the retard of the ignition timing with respect to an adapted value is executed in response to detection of the acceleration request at the time point t7. It should be noted that another example of the engine torque decrease control may be a lean correction of the air-fuel ratio by decreasing the fuel injection amount.

5-1-1-2. Engine Torque Increase Control

Figure 10:
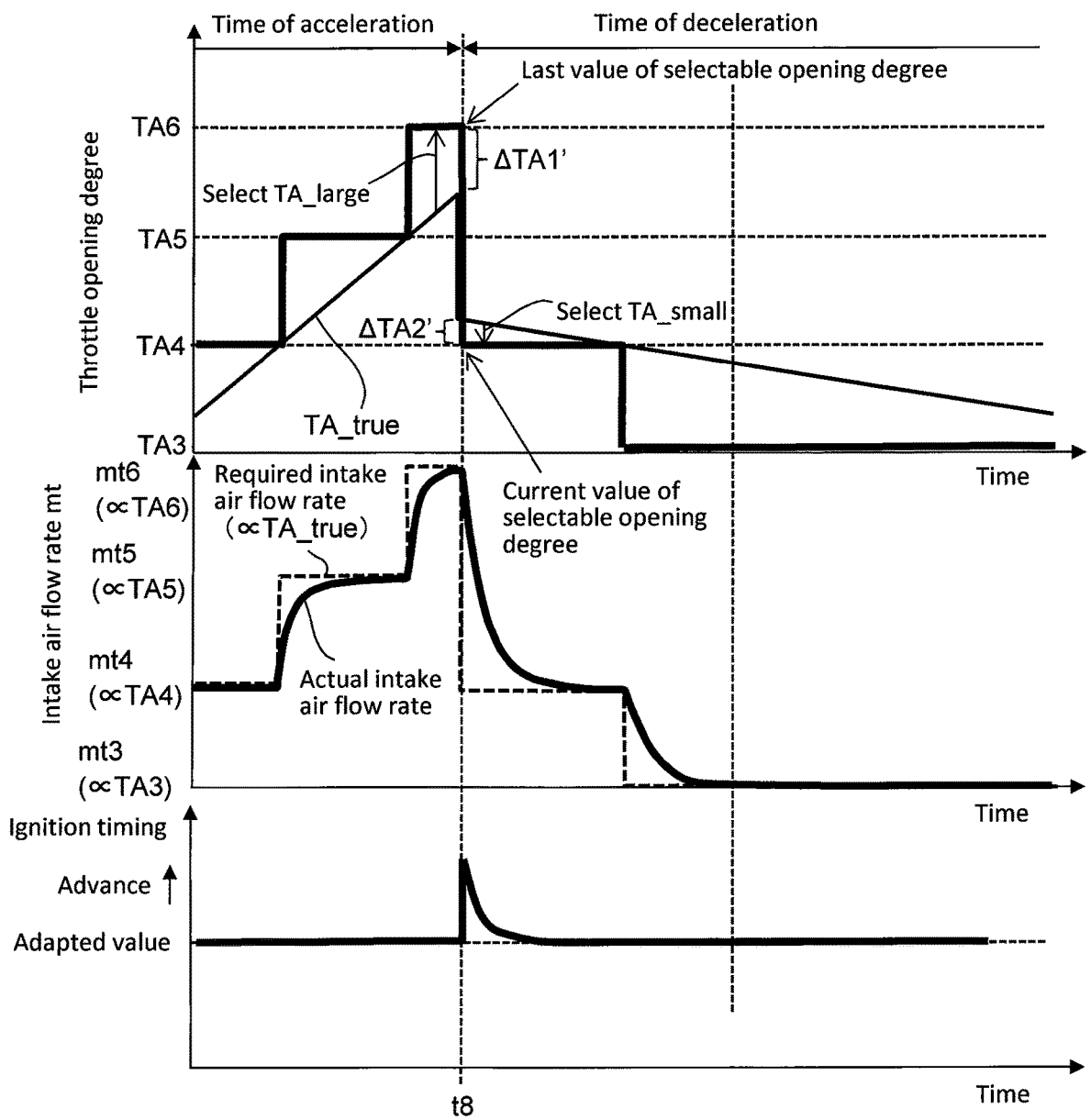
FIG. 10 is a time chart for describing an engine torque increase control.

FIG. 10 is a time chart for describing the engine torque increase control. Contrary to the example shown in FIG. 9, a selectable opening degree that is smaller, by two or more steps, than the previously selected throttle opening degree may be selected after the first throttle opening degree TA_large is selected. As shown in FIG. 10, this kind of selection is performed, for example, when a rapid deceleration is performed after an acceleration.

In detail, according to the example shown in FIG. 10, a time period before a time point t8 is associated with the time of acceleration, and thus, the first throttle opening degree TA_large greater than the required throttle opening degree TA_true is selected as the target opening degree. At the time point t8, a deceleration request in response to a release of the accelerator pedal is issued, and, as a result, the required throttle opening degree TA_true transitions to a value between the selectable opening degrees TA4 and TA5 from a value between the selectable opening degrees TA5 and TA6. As a result, the target opening degree of the throttle control is changed to the selectable opening degree TA4 corresponding to the second throttle opening degree TA_small selected at the time of deceleration, from the selectable opening degree TA6 corresponding to the first throttle opening degree TA_large selected at the time of acceleration. That is to say, according to this example, a selectable opening degree (TA4) smaller by two steps is selected after the first throttle opening degree TA_large (TA6) is selected.

As exemplified in FIG. 10, where a deceleration request is issued after an acceleration, if a throttle opening degree smaller than the second throttle opening degree TA_small (in the example shown in FIG. 10, TA5) using, as the reference, the required throttle opening degree TA_true immediately before the deceleration request is requested, the selectable opening degree becomes smaller by two or more steps. As a result, the difference of the intake air flow rate mt becomes greater. In more detail, a difference of the intake air flow rate mt depending on the sum of throttle opening degree differences ΔTA1' and ΔTA2' shown in FIG. 10 is produced. This leads to a greater difference of the engine torque Te.

Therefore, according to the present embodiment, where a selectable opening degree smaller by two or more steps is selected after the first throttle opening degree TA_large is selected, the engine torque increase control is executed in order to compensate for a shortage Te_shortage of the engine torque Te. One example of this engine torque increase control is an advance of the ignition timing, and, according to the example shown in FIG. 10, the advance of the ignition timing with respect to an adapted value is executed in response to detection of the deceleration request at the time point t8. It should be noted that another example of the engine torque increase control may be a rich correction of the air-fuel ratio by increasing the fuel injection amount.

5-1-2. Processing of Control Device Concerning Control of Vehicle System

Figure 11:
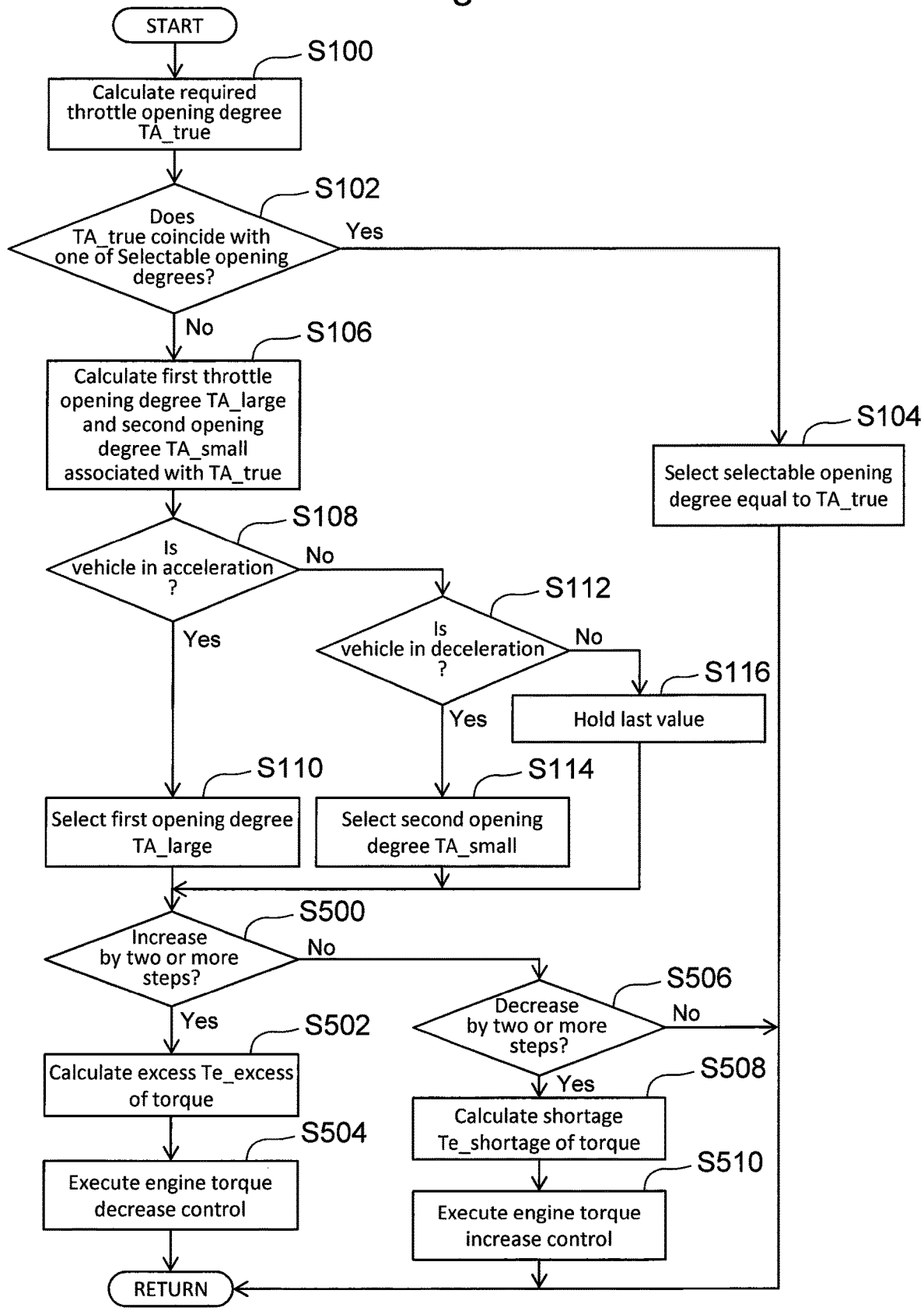
FIG. 11 is a flow chart that illustrates a routine of the processing concerning control of a vehicle system according to a fifth embodiment of the present disclosure.

FIG. 11 is a flow chart that illustrates a routine of the processing concerning the control of the vehicle system 10 according to the fifth embodiment of the present disclosure.

According to the routine shown in FIG. 11, after the control device 50 selects the current value of the target opening degree by the processing of steps S110, S114 or S116, the processing proceeds to step S500. In step S500, the control device 50 determines whether or not the current selectable opening degree has increased, by two or more steps, as compared to the last value (i.e., a value in the last processing cycle) thereof.

If the determination result of step S500 is positive (for example, FIG. 9), the processing proceeds to step S502. In step S502, the control device 50 calculates an excess Te_excess of the engine torque Te with respect to the required engine torque due to an increase of the selectable opening degree by two or more steps. One example of the calculation manner of the excess Te_excess is as follows.

That is to say, first, a torque difference ΔTe that is a difference between the current value of the engine torque Te associated with the current value of the selectable opening degree (i.e., first throttle opening degree TA_large used when an acceleration request is issued) and the last value of the engine torque Te associated with the last value of the selectable opening degree (i.e., second throttle opening degree TA_small immediately before the acceleration request) is calculated. Then, a required torque difference ΔTeR that is a difference between the current value of the required engine torque associated with the current value of the required throttle opening degree TA_true and the last value of the required engine torque associated with the last value of the required throttle opening degree TA_true is similarly calculated. Furthermore, a difference between the torque difference ΔTe and the required torque difference ΔTeR is calculated as the excess Te_excess. It should be noted that the ignition timing used for the calculation of these torque differences ΔTe and ΔTeR is an adapted value (for example, a value according to the engine load and the engine speed).

Then, in step S504, the control device 50 executes the engine torque decrease control. Specifically, the retard of the ignition timing is executed with a retard amount according to the calculated excess Te_excess. In more detail, this retard of the ignition timing is executed with the above-described retard amount in a processing cycle at which an increase of the selectable opening degree by two or more steps is detected. In addition, as shown in FIG. 9, the retard amount is thereafter decreased toward an adapted value with a lapse of time.

If, on the other hand, the determination result of step S500 is negative, the processing proceeds to step S506. In step S506, the control device 50 determines whether or not the current selectable opening degree has decreased, by two or more steps, as compared to the last value.

If, the determination result of step S506 is negative, the control device 50 ends the current processing cycle. If, on the other hand, this determination result is positive (for example, FIG. 10), the processing proceeds to step S508. In step S508, the control device 50 calculates a shortage Te_shortage of the engine torque Te with respect to the required engine torque due to a decrease of the selectable opening degree by two or more steps. One example of the calculation manner of the shortage Te_shortage is the same as the above-described calculation manner of the excess Te_excess.

Then, in step S510, the control device 50 executes the engine torque increase control. Specifically, the advance of the ignition timing is executed with an advance amount depending on the calculated shortage Te_shortage. In more detail, this advance of the ignition timing is executed with the above-described advance amount in a processing cycle at which a decrease of the selectable opening degree by two or more steps is detected. In addition, as shown in FIG. 10, the advance amount is thereafter decreased toward an adapted value with a lapse of time.

5-2. Advantageous Effects

According to the control of the present embodiment described so far, where a selectable opening degree greater by two or more steps is selected after the second throttle opening degree TA_small is selected, the engine torque decrease control is executed. As a result, a torque difference (i.e., torque shock) due to an increase of the selectable opening degree by two or more steps can be reduced.

Furthermore, where a selectable opening degree smaller by two or more steps is selected after the first throttle opening degree TA_large is selected, the engine torque increase control is executed. As a result, a torque difference (torque shock) due to a decrease of the selectable opening degree by two or more steps can be reduced.

5-3. Other Examples of Combination of Controls of Vehicle System

The engine torque decrease control and the engine torque increase control according to the fifth embodiment described above may alternatively be executed along with at least one of the first and second driving force adjustment controls according to the second embodiment. As a result, by the use of the torque adjustment concerning the engine torque Te by the engine torque decrease control and the engine torque increase control, the burden of the first and second driving force adjustment controls can be reduced. In addition, the engine torque decrease control and the engine torque increase control according to the fifth embodiment may alternatively be combined with the throttle control according to each of other third and fourth embodiments.

Furthermore, the engine torque decrease control and the engine torque increase control according to the fifth embodiment may be applied to vehicle systems of other hybrid types (for example, a parallel type) or a system of a vehicle on which only an internal combustion engine is mounted as its power device, instead of the vehicle system 10.

6. Sixth Embodiment

Then, a sixth embodiment according to the present disclosure will be described with reference to FIG. 12.
6-1. Example of Configuration of Vehicle System
It is supposed that the configuration shown in FIG. 1 is used as an example of the hardware configuration of the vehicle system according to the present embodiment. However, the vehicle system 10 according to the present embodiment is different from the vehicle system 10 according to the first embodiment in terms of the configuration of the throttle opening degree selecting component 60. That is to say, according to the present embodiment, the throttle opening degree selecting component 60 corresponds to an example of the "throttle opening degree selecting component" according to another aspect of the present disclosure.
6-2. Control of Vehicle System
6-2-1. Outline of Throttle Control
The throttle control according to the present embodiment is different from the throttle control according to the first embodiment in terms of the selection of the throttle opening degree being performed in accordance with the magnitude of the SOC of the battery 46 instead of the selection according to whether the vehicle is in acceleration or in deceleration.

Specifically, according to the present embodiment, if the SOC is lower than a designated threshold value TH4 (that is, if the charging request is relatively high), the first throttle opening degree TA_large is selected. If, on the other hand, the SOC is higher than or equal to the threshold value TA4 (that is, if the charging request is relatively low), the second throttle opening degree TA_small is selected. It should be noted that the threshold value TH4 corresponds to an example of the "fourth threshold value" according to the present disclosure.
6-2-2. Processing of Control Device Concerning Control of Vehicle System
FIG. 12 is a flow chart that illustrates a routine of the processing concerning the control of the vehicle system 10 according to the sixth embodiment of the present disclosure.

Figure 12:
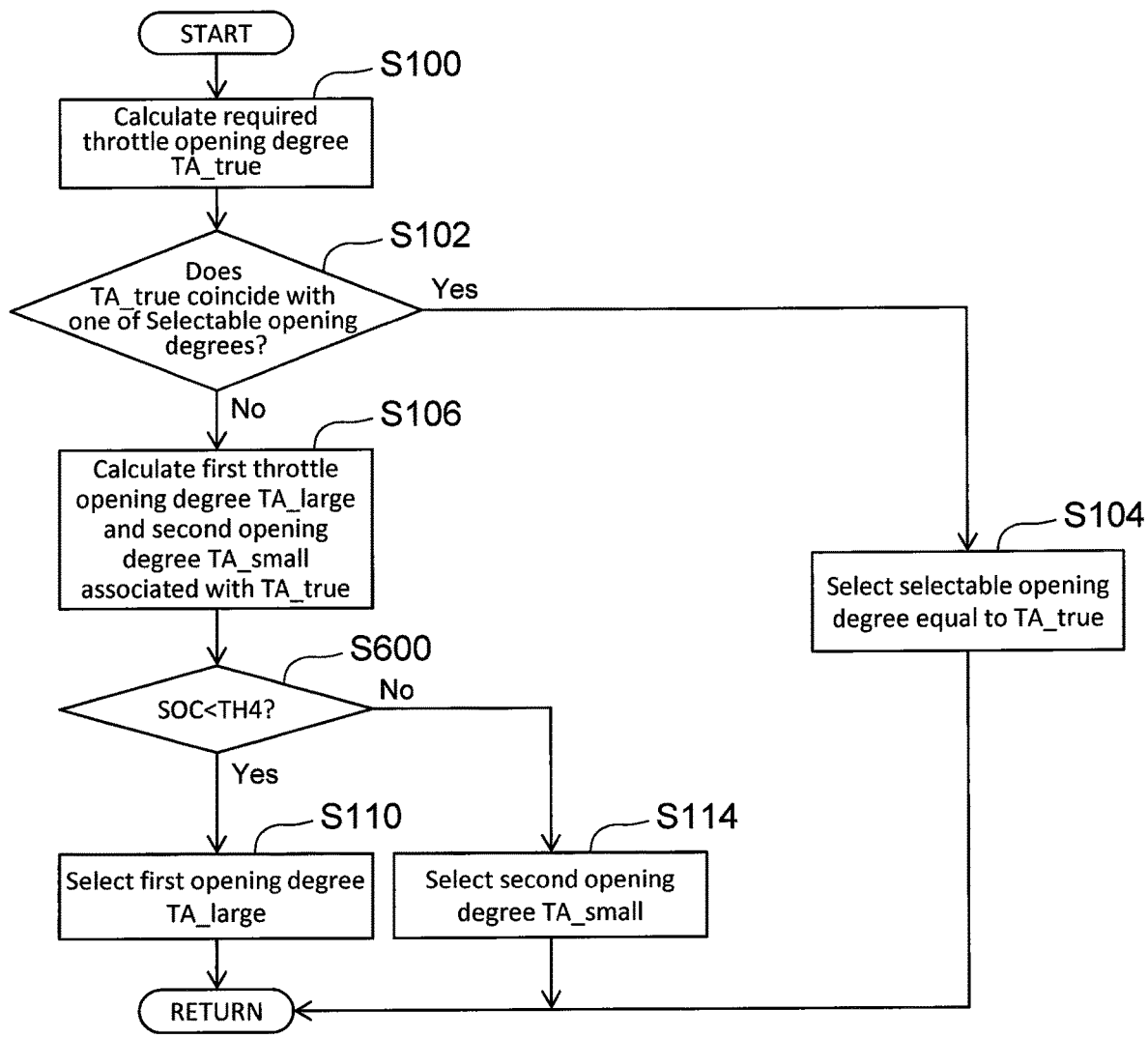
FIG. 12 is a flow chart that illustrates a routine of the processing concerning control of a vehicle system according to a sixth embodiment of the present disclosure.

According to the routine shown in FIG. 12, after the calculation processing of the first throttle opening degree TA_large and the second throttle opening degree TA_small in step S106, the processing proceeds to step S600. In step S600, the control device 50 (throttle opening degree selecting component 60) determines whether or not the SOC is lower than the threshold value TH4 described above. The threshold value TH4 can be set similarly to the threshold value TH2. That is to say, the threshold value TH4 may be a desired constant value, or be changed in accordance with, for example, the battery temperature. In more detail, the threshold value TH4 may be decreased when the battery temperature is lower.

If the determination result of step S600 is positive (SOC<TH4), that is, if the charging request is relatively high, the processing proceeds to step S110. As a result, the first throttle opening degree TA_large is selected.

If, on the other hand, the determination result of step S600 is negative (SOC≥TH4), that is, if the charging request is relatively low, the processing proceeds to step S114. As a result, the second throttle opening degree TA_small is selected.
6-3. Advantageous Effects
According to the throttle control of the present embodiment described so far, it is determined which of the selectable opening degrees is selected, in consideration of the magnitude of the SOC of the battery 46 (i.e., the degree of the charging request). More specifically, if the SOC is lower than the threshold value TH4 (that is, if the charging request is relatively high), the first throttle opening degree TA_large is selected, and, if the SOC is higher than or equal to the threshold value TH4 (that is, if the charging request is relatively low), the second throttle opening degree TA_small is selected. As a result, even where any of the selectable opening degrees (TA1-TA10) do not coincide with the required throttle opening degree TA_true since the resolution of the throttle opening degree is low, an appropriate throttle opening degree depending on the condition of the vehicle (i.e., the magnitude of the SOC) can be selected. Because of this, an efficient charging can be performed while lowering the resolution of the throttle opening degree to reduce cost.
6-4. Other Examples of Vehicle System
The throttle control according to the sixth embodiment described above may be applied to vehicle systems of other hybrid types (for example, a series type) instead of the vehicle system 10, as long as it is applied to a systems of a vehicle including an electric generator that generates an electric power using the engine torque Te and a battery that stores an electric power generated by this electric generator.

7. Other Examples of Required Throttle Opening Degree Setting Component

In the first to sixth embodiments described above, the example of "the required throttle opening degree required for the vehicle" is the required throttle opening degree TA_true associated with an engine torque request received by the vehicle from the driver via the accelerator pedal (or brake pedal). However, the "required throttle opening degree" according to the present disclosure may be, for example, set as follows, instead of the example of it being set on the basis of a pedal operation by the driver as described above. That is to say, in an example of a vehicle system including an automated driving controlling component to achieve an automated driving function, a required throttle opening degree that is set by the automated driving controlling component during execution of automated driving may be used. In addition, in an example of a vehicle system using an adaptive cruise control (ACC) to cause the vehicle to follow the forerunning vehicle, a required throttle opening degree that is set using this ACC may be used.

The embodiments and modification examples described above may be combined in other ways than those explicitly described above as required and may be modified in various ways without departing from the scope of the present disclosure.

What is claimed is:

1. A vehicle system, comprising:
an internal combustion engine including an electronically-controlled throttle valve configured to change throttle opening degrees in a step-wise manner among at least three selectable opening degrees, and being mounted on a vehicle;
an electric generator configured to generate an electric power using an engine torque of the internal combustion engine;
a battery configured to store an electric power generated by the electric generator, and
a control device configured to:
set a required throttle opening degree required for the vehicle, and
select among the at least three selectable opening degrees when the required throttle opening degree does not coincide with any of the at least three selectable opening degrees by:
selecting, at a time of acceleration of the vehicle, one of the at least three selectable opening degrees that is greater than the required throttle opening degree and that is closest to the required throttle opening degree, and
selecting, at a time of deceleration of the vehicle, one of the at least three selectable opening degrees that is smaller than the required throttle opening degree and that is closest to the required throttle opening degree,
wherein the control device is configured to select the second throttle opening degree where a charging power upper limit value of the battery is lower than a first threshold value at the time of acceleration.

2. The vehicle system according to claim 1, further comprising an electric motor operative to drive the vehicle,
wherein the control device is configured to control an engine torque of the internal combustion engine and a motor torque of the electric motor such that a required driving force required for the vehicle is met, and
wherein the control device is configured, where there is excess or shortage of the engine torque due to selection of the first throttle opening degree or the second throttle opening degree by the throttle opening degree selecting component, to control the motor torque such that a driving force of the vehicle approaches the required driving force.

3. The vehicle system according to claim 1,
wherein the control device is configured, where there is excess of the engine torque due to selection of the first throttle opening degree by the throttle opening degree selecting component, to execute a second driving force adjustment control to control a power generation load of the electric generator such that a driving force of the vehicle approaches a required driving force required for the vehicle.

4. The vehicle system according to claim 1,
wherein the control device is configured to select the first throttle opening degree where a charging rate of the battery is lower than a second threshold value at the time of deceleration.

5. The vehicle system according to claim 1,
wherein the control device is configured to select the second throttle opening degree where a charging rate of the battery is higher than a second threshold value at the time of acceleration.

6. The vehicle system according to claim 1,
wherein the control device is configured, where selecting a selectable opening degree greater by two or more steps than the second throttle opening degree after selection of the second throttle opening degree, to decrease an excess of an engine torque of the internal combustion engine.

7. The vehicle system according to claim 1,
wherein the control device is configured, where selecting a selectable opening degree smaller by two or more steps than the first throttle opening degree after selection of the first throttle opening degree, to increase an engine torque of the internal combustion engine to compensate for a shortage of the engine torque of the internal combustion engine.

8. A vehicle system, comprising:
an internal combustion engine including an electronically-controlled throttle valve configured to change throttle opening degrees in a step-wise manner among at least three selectable opening degrees, and being mounted on a vehicle;
an electric generator configured to generate an electric power using an engine torque of the internal combustion engine;
a battery configured to store an electric power generated by the electric generator; and
a control device configured to:
set a required throttle opening degree and
where the required throttle opening degree does not coincide with any of the at least three selectable opening degrees, select a throttle opening degree among the at least three selectable opening degrees by:
selecting, where a charging rate of the battery is lower than a threshold value, a first throttle opening degree that is greater than the required throttle opening degree and is closest to the required throttle opening degree, and
selecting, where the charging rate is higher than or equal to the threshold value, a second throttle opening degree that is smaller than the required throttle opening degree and is closest to the required throttle opening degree.

9. A vehicle system, comprising:
an internal combustion engine including an electronically-controlled throttle valve configured to change throttle opening degrees in a step-wise manner among at least three selectable opening degrees, and being mounted on a vehicle;
an electric generator configured to generate an electric power using an engine torque of the internal combustion engine;
a battery configured to store an electric power generated by the electric generator, and
a control device configured to:
set a required throttle opening degree required for the vehicle, and
select among the at least three selectable opening degrees when the required throttle opening degree does not coincide with any of the at least three selectable opening degrees by:
selecting, at a time of acceleration of the vehicle, one of the at least three selectable opening degrees that is greater than the required throttle opening degree and that is closest to the required throttle opening degree, and
selecting, at a time of deceleration of the vehicle, one of the at least three selectable opening degrees that is smaller than the required throttle opening degree and that is closest to the required throttle opening degree;

wherein the control device is configured to select the first throttle opening degree where a charging rate of the battery is lower than a threshold value at the time of deceleration.

\* \* \* \* \*